US012609860B1

(12) United States Patent
Koo et al.

(10) Patent No.: US 12,609,860 B1
(45) Date of Patent: Apr. 21, 2026

(54) SYSTEMS AND METHODS FOR PROBABILITY DISTRIBUTION MANAGEMENT IN DISTRIBUTED COMPUTING ENVIRONMENTS

(71) Applicant: DK Crown Holdings Inc., Boston, MA (US)

(72) Inventors: Richard Koo, South Amboy, NJ (US); James Brian Scroggins, Jr., Henderson, NV (US); Jerry Gonzalez, Westford, MA (US); Gregory Andrew Lozeau, Marshfield, MA (US)

(73) Assignee: DK Crown Holdings Inc., Boston, MA (US)

( * ) Notice: Subject to any disclaimer, the term of this patent is extended or adjusted under 35 U.S.C. 154(b) by 0 days.

(21) Appl. No.: 19/237,924

(22) Filed: Jun. 13, 2025

(51) Int. Cl.
*H04L 41/06* (2022.01)
*G06F 9/451* (2018.01)

(52) U.S. Cl.
CPC .............. *H04L 41/06* (2013.01); *G06F 9/451* (2018.02)

(58) Field of Classification Search
None
See application file for complete search history.

(56) References Cited

U.S. PATENT DOCUMENTS

| | | | | |
|---|---|---|---|---|
| 2017/0278591 | A1* | 9/2017 | Ovalle | H04W 4/21 |
| 2021/0042658 | A1* | 2/2021 | Sainani | G06F 16/248 |
| 2024/0104004 | A1* | 3/2024 | S | G06F 11/3688 |
| 2024/0427569 | A1* | 12/2024 | Pike | G06F 8/34 |
| 2025/0069483 | A1* | 2/2025 | Corrente | G07F 17/3267 |

* cited by examiner

*Primary Examiner* — Ranodhi Serrao
(74) *Attorney, Agent, or Firm* — Foley & Lardner LLP

(57) ABSTRACT

Systems and methods for dynamically modifying application conditions are disclosed. A system can provide a respective interface for a network-accessible application to a plurality of client devices. The system can randomly select an initial subset of the plurality of tiles for display at the client devices. The system can generate initial application state values based on the plurality of tiles less the initial subset. The system can provide the one or more initial application state values to the plurality of client devices for display. The system can receive input values from the client devices. The system can execute the network-accessible application according to the input values. The system can generate a respective output value for each client device based on the input values.

16 Claims, 14 Drawing Sheets

Client *102a*

Agent 103a

Agent 103n

Client *102n*

Network *104*

Server *106a*          Server *106b*          Server *106n*

300

308f 328  326

306

FINISH

0

SIDE BETS

STOPPERS

FIRST CARD

| Over 7.5 |
| 3.89 |
| Under 7.5 |
| 1.06 |

CARDS DEALT

| 6 - 9 |
| 2.97 |
| 10 - 14 |
| 2.21 |
| 15 - 18 |
| 2.89 |
| 19 - 23 |
| 3.43 |
| 24 - 26 |
| 2.20 |

324

| 4 ♠ | 2 ♠ | Q ♡ | 2 ♣ | 3 ♢ |

| 2 ♠ | 1 ♡ | 1 ♣ | 1 ♢ |

STOPPERS

| 0 |
| 1.75 |
| 1 |
| 1.13 |
| 2 |
| 3.08 |
| 3 |
| 2.74 |
| 4 |
| 3.94 |
| 5 |
| 3.11 |

308

ODDS DETERMINED

STALLED OUT

310a

| A ♠ | A ♡ | A ♣ | A ♢ |

| 1.66 |

310

312

310a

| ⌚41% | ⌚41% | ⌚6% | ⌚12% |
| 3.30 | 3.62 | 3.03 | 3.13 |

$75.00

314a

320

314

322

Balance: $5,000.60    Total Bet: $75.00

SYSTEMS AND METHODS FOR PROBABILITY DISTRIBUTION MANAGEMENT IN DISTRIBUTED COMPUTING ENVIRONMENTS

BACKGROUND

Providing synchronized information is useful for networked computing environments including multiple computing systems. Information can be shared using different formats or protocols. It is challenging to provide synchronized information efficiently in computing systems via computer networks having different types of computing devices.

SUMMARY

The systems and methods of this technical solution provide techniques for synchronized information sharing between multiple computing devices, which can provide additional notifications or alerts, or other content in connection with various network events. Due to their real-time nature, it can be challenging to share up-to-date information network events between multiple computing devices, including between servers and client devices that access those servers. The systems and methods of this technical solution address these and other issues by providing synchronized data structures within network communication sessions. The synchronized data structures can include metadata generated to facilitate efficient and accurate data transfer between computing devices even in computer networks with large numbers of computing devices.

The systems and methods of this technical solution provide techniques for dynamic modification of application conditions. Application conditions may be based on a pool application value pairs. For example, progression of elements within the network-accessible application may be based on application value pairs selected from this pool. By modifying the pool of application value pairs, the application conditions may be modified. For example, various elements may be updated according to different frequencies based on the application conditions. By modifying the application conditions for updating various elements of the network application, the rate at which such elements are updated can be dynamically modified. In some examples, application conditions may be modified at the start of a network session where the network-accessible application is being executed. In some implementations, different network sessions may be executed with different network application conditions, resulting in updates to different elements.

One aspect of the present disclosure relates to a system. The system can provide, to each of a plurality of client devices, a respective interface for a network-accessible application, the respective interface comprising a plurality of tiles representative of a respective portion of an application state of the network-accessible application, each of the plurality of tiles corresponding to a respective identifier value. The system can update the application state of the network-accessible application to an execution state based on a plurality of client values respectively received from each of the plurality of client devices, each of the plurality of client values corresponding to a respective tile of the plurality of tiles. The system can execute, responsive to updating the network-accessible application to the execution state, a plurality of iterations of the network-accessible application, wherein each iteration comprises. Each iteration can include selecting an application value pair from a pool of application value pairs; updating a respective status of at least one tile of the plurality of tiles responsive to a first sub-value of the application value pair matching the respective identifier value of the at least one tile; determining whether the respective status of the at least one tile satisfies an application termination condition; updating the application state to a termination state responsive to determining that the respective status of the at least one tile satisfies the application termination condition; and executing a subsequent iteration of the plurality of iterations responsive to determining that the respective status of the at least one tile does not satisfy the application termination condition.

In some implementations, the system can determine, responsive to updating the respective status of the at least one tile of the plurality of tiles, that the respective status of each tile of the plurality of tiles satisfy a status criterion. In some implementations, the system can select a second value pair from a pool of second value pairs responsive to determining the respective statuses of the plurality of tiles satisfy the status criterion. In some implementations, the system can update the respective status of a second tile of the plurality of tiles responsive to the respective status of the second tile matching a first sub-value of the second value pair. In some implementations, the system can synchronize the respective interface provided to each of the plurality of client devices. In some implementations, the system can receive an identifier of a selection and a second client value from a client device of the plurality of client devices. In some implementations, the system can update, responsive to updating the application state to the termination state, a network profile of the client device based on the identifier of the selection matching an attribute of the network-accessible application. The selection may correspond to a number of second value pairs to be selected based on the plurality of iterations of the network-accessible application.

In some implementations, the system can remove, responsive to updating the network-accessible application to the execution state, a subset of application value pairs from the pool of application value pairs. In some implementations, the system can generate an initial value for each tile of the plurality of tiles based on the pool of application value pairs less the subset of application value pairs. In some implementations, the system can provide the subset of application value pairs for display via the respective interface provided to each of the plurality of client devices. In some implementations, the system can determine, responsive to updating the respective status of the at least one tile, that the application state satisfies a removal condition. In some implementations, the system can remove a predetermined number of application value pairs from the pool of application value pairs responsive to determining that the application state satisfies the removal condition. In some implementations, the system can update, responsive to updating the application state to the termination state, a network profile of each client device based on the plurality of client values, respective tiles associated with the plurality of client values, and the at least one tile that satisfies the application termination condition. In some implementations, the system can receive an interaction from a client device of the plurality of client devices indicating movement of an interactive element to a region of the respective interface corresponding to a first tile of the plurality of tiles. In some implementations, the system can generate an association between the first tile and a respective client value received from the client device based on the interaction.

Another aspect of the present disclosure relates to a method. The method includes providing, by at least one processor, to each of a plurality of client devices, a respective interface for a network-accessible application, the respective interface comprising a plurality of tiles representative of a respective portion of an application state of the network-accessible application, each of the plurality of tiles corresponding to a respective identifier value. The method includes updating, by the at least one processor, the application state of the network-accessible application to an execution state based on a plurality of client values respectively received from each of the plurality of client devices, each of the plurality of client values corresponding to a respective tile of the plurality of tiles. The method includes executing, by the at least one processor, responsive to updating the network-accessible application to the execution state, a plurality of iterations of the network-accessible application, wherein each iteration comprises. Each iteration includes selecting an application value pair from a pool of application value pairs; updating a respective status of at least one tile of the plurality of tiles responsive to a first sub-value of the application value pair matching the respective identifier value of the at least one tile; determining whether the respective status of the at least one tile satisfies an application termination condition; and updating the application state to a termination state responsive to determining that the respective status of the at least one tile satisfies the application termination condition; or executing a subsequent iteration of the plurality of iterations responsive to determining that the respective status of the at least one tile does not satisfy the application termination condition.

In some implementations, the method includes determining, by the at least one processor, responsive to updating the respective status of the at least one tile of the plurality of tiles, that the respective status of each tile of the plurality of tiles satisfy a status criterion. In some implementations, the method includes selecting, by the at least one processor, a second value pair from a pool of second value pairs responsive to determining the respective statuses of the plurality of tiles satisfy the status criterion. In some implementations, the method includes updating, by the at least one processor, the respective status of a second tile of the plurality of tiles responsive to the respective status of the second tile matching a first sub-value of the second value pair. In some implementations, the method includes synchronizing, by the at least one processor, the respective interface provided to each of the plurality of client devices.

In some implementations, the method includes receiving, by the at least one processor, an identifier of a selection and a second client value from a client device of the plurality of client devices. In some implementations, the method includes updating, by the at least one processor, responsive to updating the application state to the termination state, a network profile of the client device based on the identifier of the selection matching an attribute of the network-accessible application. The selection may correspond to a number of second value pairs to be selected based on the plurality of iterations of the network-accessible application. In some implementations, the method includes removing, by the at least one processor, responsive to updating the network-accessible application to the execution state, a subset of application value pairs from the pool of application value pairs. In some implementations, the method includes generating, by the at least one processor, an initial value for each tile of the plurality of tiles based on the pool of application value pairs less the subset of application value pairs. In some implementations, the method includes removing, by the at least one processor, responsive to updating the network-accessible application to the execution state, a subset of application value pairs from the pool of application value pairs. In some implementations, the method includes generating, by the at least one processor, an initial value for each tile of the plurality of tiles based on the pool of application value pairs less the subset of application value pairs.

In some implementations, the method includes providing, by the at least one processor, the subset of application value pairs for display via the respective interface provided to each of the plurality of client devices. In some implementations, the method includes determining, by the at least one processor, responsive to updating the respective status of the at least one tile, that the application state satisfies a removal condition. In some implementations, the method includes removing, by the at least one processor, a predetermined number of application value pairs from the pool of application value pairs responsive to determining that the application state satisfies the removal condition. In some implementations, the method includes updating, by the at least one processor, responsive to updating the application state to the termination state, a network profile of each client device based on the plurality of client values, respective tiles associated with the plurality of client values, and the at least one tile that satisfies the application termination condition. In some implementations, the method includes updating, by the at least one processor, responsive to updating the application state to the termination state, a network profile of each client device based on the plurality of client values, respective tiles associated with the plurality of client values, and the at least one tile that satisfies the application termination condition.

One aspect of the present disclosure relates to a system. The system can provide, to a plurality of client devices, a respective interface for a network-accessible application, the respective interface comprising a graphical element representing a plurality of tiles for the network-accessible application. The system can upon an update to a state of the network-accessible application and prior to receiving a plurality of input values from the plurality of client devices, randomly select an initial subset of the plurality of tiles for display at the plurality of client devices. The system can generate one or more initial application state values for the network-accessible application based on the plurality of tiles less the initial subset. The system can provide the one or more initial application state values for the network-accessible application to the plurality of client devices for display at the respective interface of the network-accessible application. The system can receive, from the plurality of client devices, the plurality of input values to advance the state of the network-accessible application. The system can execute the network-accessible application according to the plurality of input values provided from the plurality of client devices and the one or more initial application state values. The system can generate a respective output value for the network-accessible application based on the plurality of input values.

In some implementations, the system can select a first tile associated with a first identifier value from the plurality of tiles less the initial subset, wherein the plurality of tiles corresponds to a set of identifier values. In some implementations, the system can update a first status of the first identifier value. In some implementations, the system can determine that the network-accessible application satisfies an application termination condition based on the first status of the first identifier value. In some implementations, the system can generate the respective output value for each client device of the plurality of client devices based on the plurality of input values and the first status. In some implementations, the system can update a respective network profile of at least one of the plurality of client devices based on the respective output value of the at least one client device. In some implementations, the system can determine that the network-accessible application does not satisfy an application termination condition based on the first status of the first identifier value. In some implementations, the system can select a second tile associated with a second identifier value from the plurality of tiles less the initial subset. In some implementations, the system can update a second status of the second identifier value. In some implementations, the system can determine that the first identifier value of the set of identifier values satisfies a first criterion.

In some implementations, the system can select a second value from a pool of second values responsive to determining that the first identifier value satisfies the first criterion. In some implementations, the system can update a third status of a third identifier value from the set of identifier values responsive to the third identifier value matching the second value. In some implementations, the system can receive an input value from a client device indicating a number of selected second values from the pool of second values. In some implementations, the system can update a network profile of the client device based on the input value matching a number of second values selected from the pool of variation values during execution of the network-accessible application. In some implementations, the system can generate an initial application state value for each tile of the plurality of tiles based on the plurality of tiles less the initial subset. In some implementations, the system can provide the initial subset for display via the respective interface provided to each of the plurality of client devices. In some implementations, the system can determine that an application state of the network-accessible application satisfies a removal condition. In some implementations, the system can generate a second plurality of tiles based on removing a second subset of tiles from the plurality of tiles less the initial subset responsive to determining that the application state satisfies the removal condition. In some implementations, the system can receive an interaction from a client device of the plurality of client devices indicating movement of an interactive element to a region of the respective interface corresponding to a first tile of the plurality of tiles. In some implementations, the system can generate an association between the first tile and a respective client value received from the client device based on the interaction. In some implementations, the system can determine the client value based on the interactive element associated with the interaction received from the client device.

Another aspect of the present disclosure relates to a method. The method includes providing, by at least one processor, to a plurality of client devices, a respective interface for a network-accessible application, the respective interface comprising a graphical element representing a plurality of tiles for the network-accessible application. The method includes upon an update to a state of the network-accessible application and prior to receiving a plurality of input values from the plurality of client devices, randomly selecting, by the at least one processor, an initial subset of the plurality of tiles for display at the plurality of client devices. The method includes generating, by the at least one processor, one or more initial application state values for the network-accessible application based on the plurality of tiles less the initial subset. The method includes providing, by the at least one processor, the one or more initial application state values for the network-accessible application to the plurality of client devices for display at the respective interface of the network-accessible application. The method includes receiving, by the at least one processor, from the plurality of client devices, the plurality of input values to advance the state of the network-accessible application. The method includes executing, by the at least one processor, the network-accessible application according to the plurality of input values provided from the plurality of client devices and the one or more initial application state values. The method includes generating, by the at least one processor, a respective output value for the network-accessible application based on the plurality of input values.

In some implementations, the method includes selecting, by the at least one processor, a first tile associated with a first identifier value from the plurality of tiles less the initial subset, wherein the plurality of tiles corresponds to a set of identifier values. In some implementations, the method includes updating, by the at least one processor, a first status of the first identifier value. In some implementations, the method includes determining, by the at least one processor, that the network-accessible application satisfies an application termination condition based on the first status of the first identifier value. In some implementations, the method includes generating, by the at least one processor, the respective output value for each client device of the plurality of client devices based on the plurality of input values and the first status. In some implementations, the method includes updating, by the at least one processor, a respective network profile of at least one of the plurality of client devices based on the respective output value of the at least one client device. In some implementations, the method includes determining, by the at least one processor, that the network-accessible application does not satisfy an application termination condition based on the first status of the first identifier value. In some implementations, the method includes selecting, by the at least one processor, a second tile associated with a second identifier value from the plurality of tiles less the initial subset. In some implementations, the method includes updating, by the at least one processor, a second status of the second identifier value.

In some implementations, the method includes determining, by the at least one processor, that the first identifier value of the set of identifier values satisfies a first criterion. In some implementations, the method includes selecting, by the at least one processor, a second value from a pool of second values responsive to determining that the first identifier value satisfies the first criterion. In some implementations, the method includes updating, by the at least one processor, a third status of a third identifier value from the set of identifier values responsive to the third identifier value matching the second value. In some implementations, the method includes receiving, by the at least one processor, an input value from a client device indicating a number of selected second values from the pool of second values. In some implementations, the method includes updating, by the at least one processor, a network profile of the client device based on the input value matching a number of second values selected from the pool of variation values during execution of the network-accessible application. In some implementations, the method includes generating, by the at least one processor, an initial application state value for each tile of the plurality of tiles based on the plurality of tiles less the initial subset. In some implementations, the method includes providing, by the at least one processor, the initial subset for display via the respective interface provided to each of the plurality of client devices.

In some implementations, the method includes determining, by the at least one processor, that an application state of the network-accessible application satisfies a removal condition. In some implementations, the method includes generating, by the at least one processor, a second plurality of tiles based on removing a second subset of tiles from the plurality of tiles less the initial subset responsive to determining that the application state satisfies the removal condition. In some implementations, the method includes receiving, by the at least one processor, an interaction from a client device of the plurality of client devices indicating movement of an interactive element to a region of the respective interface corresponding to a first tile of the plurality of tiles. In some implementations, the method includes generating, by the at least one processor, an association between the first tile and a respective client value received from the client device based on the interaction. In some implementations, the method includes determining, by the at least one processor, the client value based on the interactive element associated with the interaction received from the client device.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form, for example, by appropriate computer programs, which may be carried on appropriate carrier media (computer readable media), which may be tangible carrier media (e.g., disks) or intangible carrier media (e.g., communications signals). Aspects may also be implemented using any suitable apparatus, which may take the form of programmable computers running computer programs arranged to implement the aspect. As used in the specification and in the claims, the singular form of 'a,' 'an,' and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIGS. 3A, 3B, 3C, 3D, 3E, 3F, and 3G depict example diagrams of graphical user interfaces that may be displayed in connection with iterative network-accessible applications, in accordance with one or more implementations;

DETAILED DESCRIPTION

Below are detailed descriptions of various concepts related to, and implementations of, techniques, approaches, methods, apparatuses, and systems for managing network sessions of network applications. The various concepts introduced above and discussed in greater detail below may be implemented in any of numerous ways, as the described concepts are not limited to any particular manner of implementation. Examples of specific implementations and applications are provided primarily for illustrative purposes.

For purposes of reading the description of the various implementations below, the following descriptions of the sections of the Specification and their respective contents may be helpful. Section A describes a network environment and computing environment to implement embodiments described herein. Section B describes systems and methods for managing network sessions of network applications.

The systems and methods of this technical solution provide techniques for synchronized information sharing between multiple computing devices, which can provide additional notifications, alerts, or other content in connection with live events. Due to their real-time nature, it can be challenging to share up-to-date information network events between multiple computing devices, including between servers and client devices that access those servers. The systems and methods of this technical solution address these and other issues by providing synchronized data structures within network communication sessions. The synchronized data structures can include metadata generated to facilitate efficient and accurate data transfer between computing devices even in computer networks with large numbers of computing devices.

A. Computing and Network Environment for Managing Network Sessions of Network Applications Referring to FIG. 1A, an embodiment of a network environment is depicted for managing network sessions of network applications. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more agents 103a-103n and one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Figure 1A:
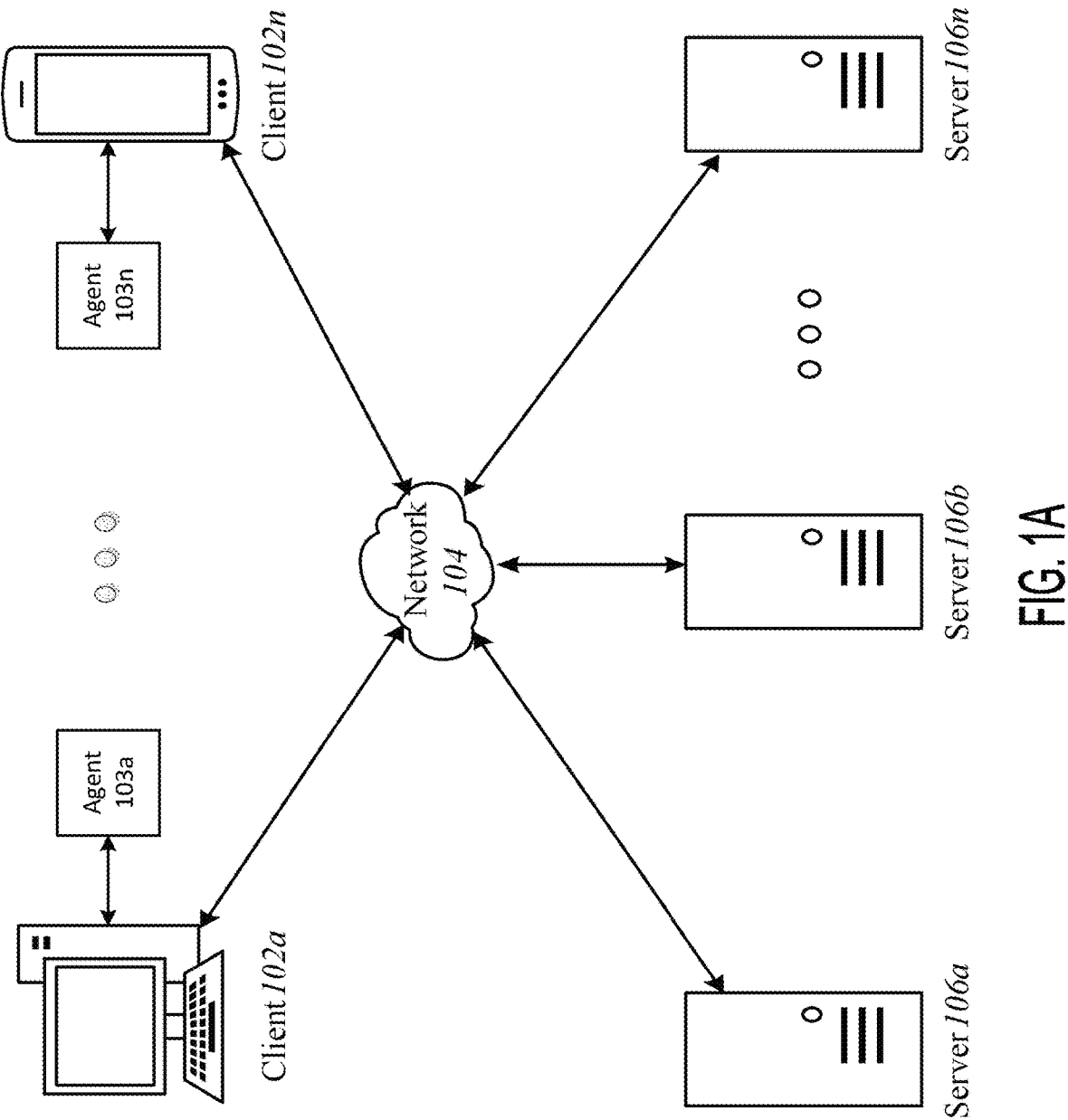
FIG. 1A is a block diagram depicting an embodiment of a network environment comprising a client device in communication with a server device.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel, or satellite band. The wireless links may also include any cellular network standards used to communicate among mobile devices, including standards that qualify as 1G, 2G, 3G, 4G, or 5G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods, e.g., FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN) (e.g., Intranet), a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 (not shown) or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous-one or more of the servers 106 or remote machines 106 can operate according to one type of operating system platform (e.g., WINDOWS NT, manufactured by Microsoft Corp. of Redmond, Washington), while one or more of the other servers 106 can operate according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks 104. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc.; the HYPER-V hypervisors provided by Microsoft, or others. Hosted hypervisors may run within an operating system on a second software level. Examples of hosted hypervisors may include VMware Workstation and VIRTUALBOX.

Management of the machine farm 38 may be decentralized. For example, one or more servers 106 may comprise components, subsystems, and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 106 may be in the path between any two communicating servers.

Figure 1B:
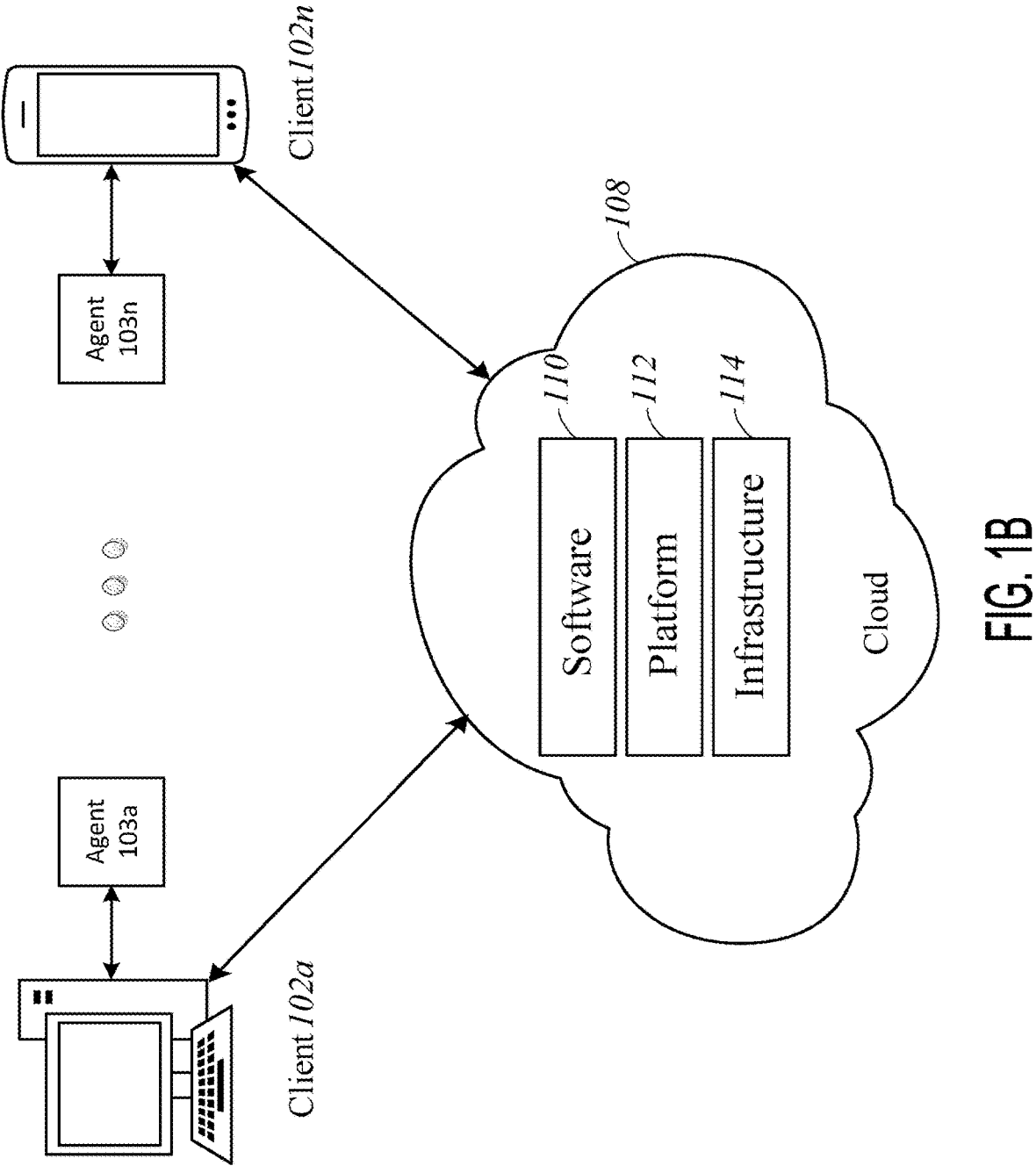
FIG. 1B is a block diagram depicting a cloud computing environment comprising a client device in communication with cloud service providers.

Referring to FIG. 1B, a cloud computing environment is depicted for managing network sessions of network applications. A cloud computing environment may provide client 102 with one or more resources provided by a network environment. The cloud computing environment may include one or more clients 102a-102n, in communication with respective agents 103a-103n and with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms, or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds 108 may be connected to the servers 106 over a public network 104. Private clouds 108 may include private servers 106 that are physically maintained by clients 102 or owners of clients. Private clouds 108 may be connected to the servers 106 over a private network 104. Hybrid clouds 108 may include both the private and public networks 104 and servers 106.

The cloud 108 may also include a cloud based delivery, e.g., Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington; RACKSPACE CLOUD provided by Rackspace US, Inc., of San Antonio, Texas; Google Compute Engine provided by Google Inc. of Mountain View, California; or RIGHTSCALE provided by RightScale, Inc., of Santa Barbara, California. PaaS providers may offer functionality provided by IaaS, including, e.g., storage, networking, servers, or virtualization, as well as additional resources such as, e.g., the operating system, middleware, or runtime resources. Examples of PaaS include WINDOWS AZURE provided by Microsoft Corporation of Redmond, Washington; Google App Engine provided by Google Inc.; and HEROKU provided by Heroku, Inc., of San Francisco, California. SaaS providers may offer the resources that PaaS provides, including storage, networking, servers, virtualization, operating system, middleware, or runtime resources. In some embodiments, SaaS providers may offer additional resources, including, e.g., data and application resources. Examples of SaaS include GOOGLE APPS provided by Google Inc.; SALESFORCE provided by Salesforce.com Inc. of San Francisco, California; or OFFICE 365 provided by Microsoft Corporation. Examples of SaaS may also include data storage providers, e.g., DROPBOX provided by Dropbox, Inc., of San Francisco, California; Microsoft SKYDRIVE provided by Microsoft Corporation; Google Drive provided by Google Inc.; or Apple ICLOUD provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages, including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g., GOOGLE CHROME, Microsoft INTERNET EXPLORER, or Mozilla Firefox provided by Mozilla Foundation of Mountain View, California). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
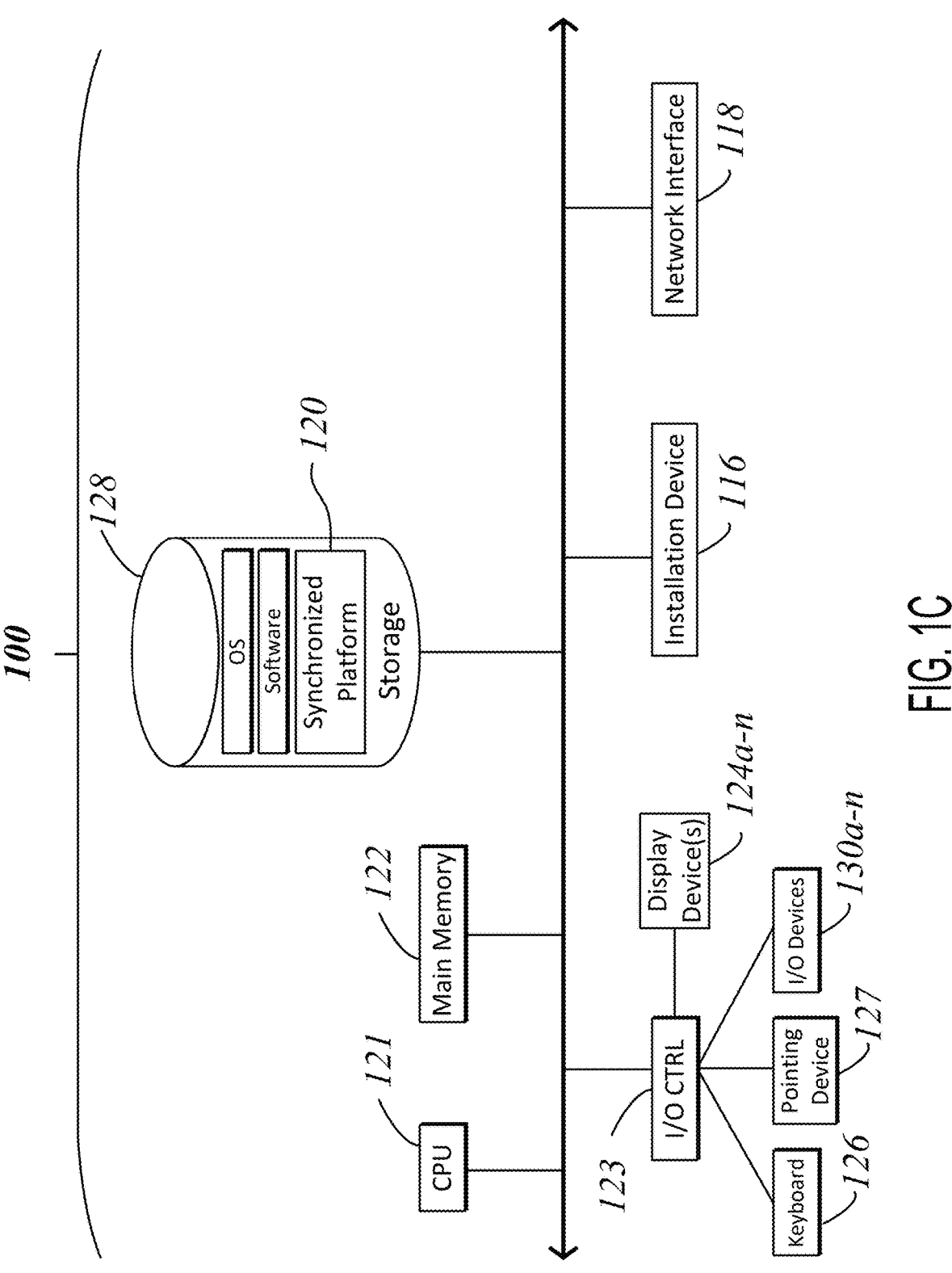
FIGS. 1C and 1D are block diagrams depicting embodiments of computing devices useful in connection with the methods and systems described herein.
Figure 1D:
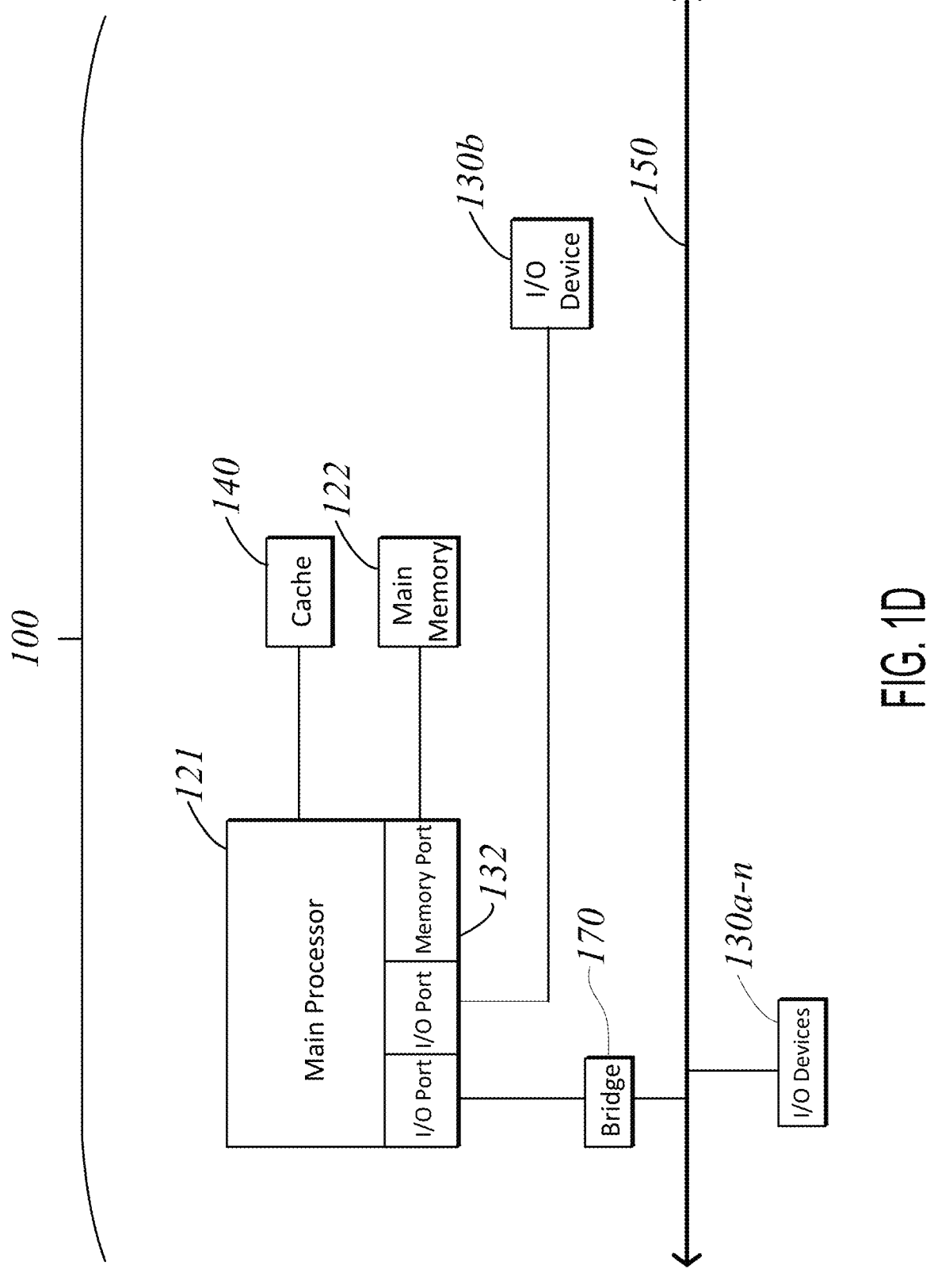

The client 102 and server 106 may be deployed as and/or executed on any type and form of computing device, e.g., a computer, network device or appliance capable of communicating on any type and form of network and performing the operations described herein. FIGS. 1C and 1D depict block diagrams of a computing device 100 useful for practicing an embodiment of the client 102 or a server 106, for managing network sessions of network applications. As shown in FIGS. 1C and 1D, each computing device 100 includes a central processing unit 121 and a main memory unit 122. As shown in FIG. 1C, a computing device 100 may include a storage device 128, an installation device 116, a network interface 118, an I/O controller 123, display devices 124a-124n, a keyboard 126, and a pointing device 127, e.g., a mouse. The storage device 128 may include, without limitation, an operating system, software, and synchronized platform 120, which can implement any of the features of the data processing system 205 described herein below in conjunction with FIG. 2. As shown in FIG. 1D, each computing device 100 may also include additional optional elements, e.g., a memory port 132, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g., those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction level parallelism, thread level parallelism, different levels of cache, and multicore processors. A multi-core processor may include two or more processing units on a single computing component.

Examples of a multi-core processors include the AMD PHENOM IIX2, INTEL CORE i5, INTEL CORE i7, and INTEL CORE i9.

Main memory unit 122 may include one or more memory chips capable of storing data and allowing any storage location to be directly accessed by the microprocessor 121. Main memory unit 122 may be volatile and faster than storage 128 memory. Main memory units 122 may be dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferro-electric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 132. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANS-PORT, RAPIDIO, or INFINIBAND communications tech-nology. FIG. 1D also depicts an embodiment in which local busses and direct communication are mixed: the processor 121 communicates with I/O device 130a using a local interconnect bus 150 while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyro-scopic sensors, or other sensors. Output devices may include video displays, graphical displays, speakers, headphones, inkjet printers, laser printers, and 3D printers.

Devices 130a-130n may include a combination of mul-tiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provide for facial recognition which may be utilized as an input for different purposes including authentication and other com-mands. Some devices 130a-130n provides for voice recog-nition and inputs, including, e.g., Microsoft KINECT, SIRI for IPHONE by Apple, Google Now, or Google Voice Search.

Additional devices 130a-130n have both input and output capabilities, including, e.g., haptic feedback devices, touch-screen displays, or multi-touch displays. Touchscreen, multi-touch displays, touchpads, touch mice, or other touch sensing devices may use different technologies to sense touch, including, e.g., capacitive, surface capacitive, pro-jected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality, including, e.g., pinch, spread, rotate, scroll, or other gestures. Some touch-screen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augmented reality devices. The I/O devices 130a-130n may be controlled by an I/O controller 123 as shown in FIG. 1C. The I/O controller 123 may control one or more I/O devices 130a-130n, such as, e.g., a keyboard 126 and a pointing device 127, e.g., a mouse or optical pen. Furthermore, an I/O device 130 may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g., a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film tran-sistor LCD (TFT-LCD), blue phase LCD, electronic papers (e-ink) displays, flexile displays, light emitting diode dis-plays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g., stereos-copy, polarization filters, active shutters, or autostereo-scopic. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect, or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g., one or more hard disk drives or redundant arrays of independent disks) for storing an operating system or other related software, and for storing application software programs such as any program related to the synchronized platform 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via an I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software 110 can be run from a bootable medium, for example, a bootable CD, e.g., KNOPPIX, a bootable CD for GNU/Linux that is available as a GNU/Linux distribution from knoppix.net.

Client device 100 may also install software 110 or application from an application distribution platform 112. Examples of application distribution platforms 112 include the App Store for iOS provided by Apple, Inc.; the Mac App Store provided by Apple, Inc.; GOOGLE PLAY for Android OS provided by Google Inc.; Chrome Webstore for CHROME OS provided by Google Inc.; and Amazon Appstore for Android OS and KINDLE FIRE provided by Amazon.com, Inc. An application distribution platform 112 may facilitate installation of software 110 on a client device 102. An application distribution platform 112 may include a repository of applications on a server 106 or a cloud 108, which the clients 102a-102n may access over a network 104. An application distribution platform 112 may include an application developed and provided by various developers. A user of a client device 102 may select, purchase, and/or download an application via the application distribution platform 112.

Furthermore, the computing device 100 may include a network interface 118 to interface to the network 104 through a variety of connections, including, but not limited to, standard telephone lines, LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol, e.g., Secure Socket Layer (SSL) or Transport Layer Security (TLS), or the Citrix Gateway Protocol manufactured by Citrix Systems, Inc., of Ft. Lauderdale, Florida. The network interface 118 may comprise a built-in network adapter, network interface card, PCMCIA network card, EXPRESSCARD network card, card bus network adapter, wireless network adapter, USB network adapter, modem, or any other device suitable for interfacing between the computing device 100 and any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to, WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Washington; MAC OS and iOS, manufactured by Apple, Inc., of Cupertino, California; and Linux, a freely-available operating system, e.g., Linux Mint distribution ("distro") or Ubuntu, distributed by Canonical Ltd. of London, United Kingdom; or Unix or other Unix-like derivative operating systems; and Android, designed by Google, of Mountain View, California, among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, a PLAYSTATION 4, PLAY-STATION 5, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, NINTENDO WII U, NINTENDO SWITCH, NINTENDO SWITCH 2 device manufactured by Nintendo Co., Ltd., of Kyoto, Japan, an XBOX 360, an XBOX ONE, an XBOX ONE S, an XBOX ONE X, an XBOX SERIES S, or an XBOX SERIES X, manufactured by the Microsoft Corporation of Redmond, Washington.

In some embodiments, the computing device 100 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats, including, but not limited to, MP3, WAV, M4A/ AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet, e.g., the IPAD line of devices by Apple; GALAXY TAB family of devices by Samsung; or KINDLE FIRE, by Amazon.com, Inc., of Seattle, Washington. In other embodiments, the computing device 100 is an eBook reader, e.g., the KINDLE family of devices by Amazon.com, or NOOK family of devices by Barnes & Noble, Inc., of New York City, New York.

In some embodiments, the communications device 102 includes a combination of devices, e.g., a smartphone combined with a digital audio player or portable media player. For example, one of these embodiments is a smartphone, e.g., the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g., a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 are monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Managing Network Sessions of Network Applications

The systems and methods of this technical solution provide techniques for synchronized information sharing between multiple computing devices, which can provide additional notifications, alerts, or other content in connection with live events. Due to their real-time nature, it can be challenging to share up-to-date information network events between multiple computing devices, including between servers and client devices that access those servers. The systems and methods of this technical solution address these and other issues by providing synchronized data structures within network communication sessions. The synchronized data structures can include metadata generated to facilitate efficient and accurate data transfer between computing devices even in computer networks with large numbers of computing devices.

Figure 2:
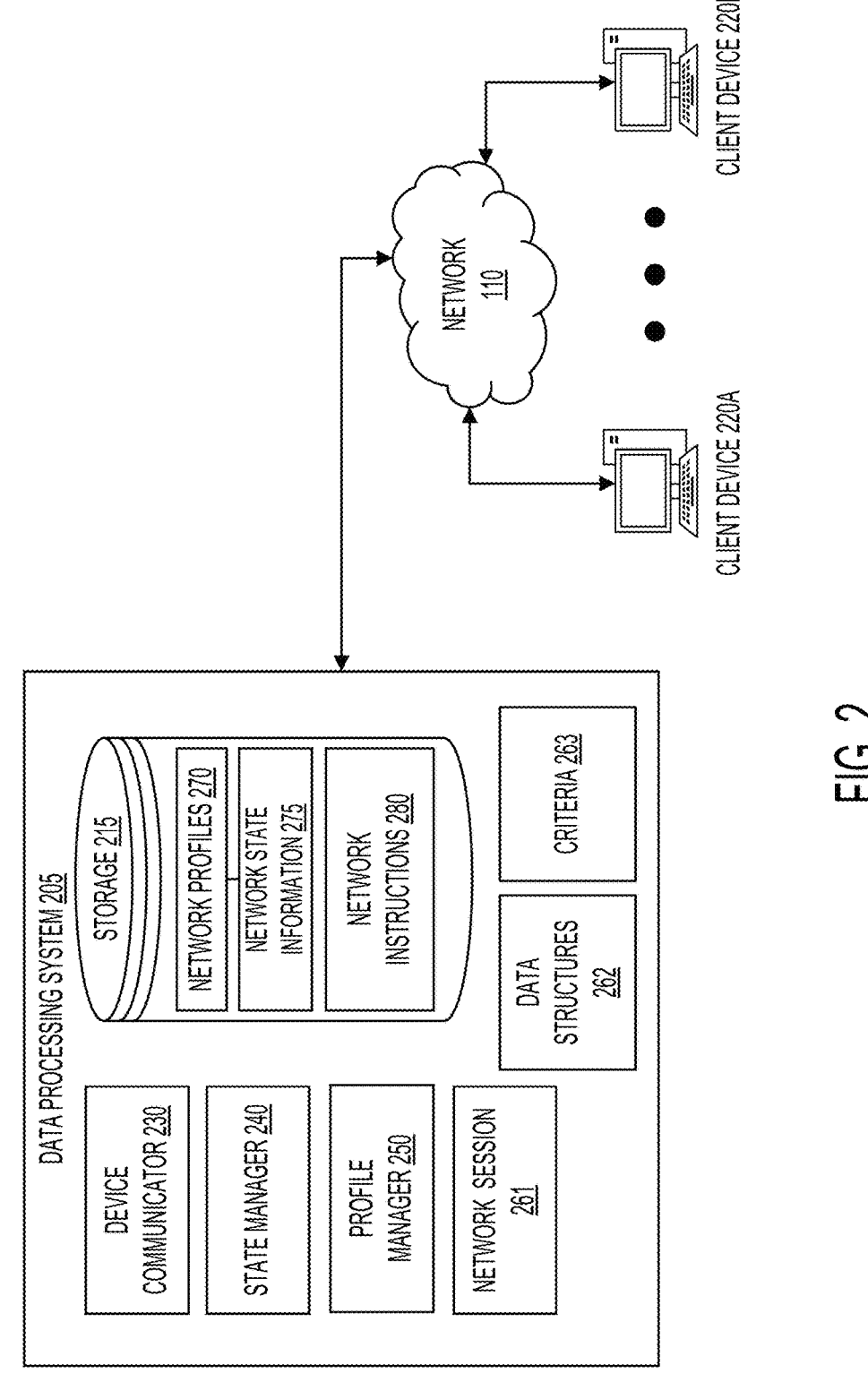
FIG. 2 is a block diagram of an example system for dynamic modification of application conditions within iterative network-accessible applications, in accordance with one or more implementations.

Referring now to FIG. 2, illustrated is a block diagram of an example system 200 for dynamic modification of application conditions within iterative network-accessible applications, in accordance with one or more implementations. In FIG. 2, the system 200 can include at least one data processing system 205, at least one network 210, and one or more client devices 220A-220N (sometimes generally referred to individually or collectively as "client device(s) 220"). In FIG. 2, the data processing system 205 can include at least one device communicator 230, at least one state manager 240, at least one profile manager 250, and at least one storage 215. The storage 215 can include one or more network profiles 270 (sometimes referred to herein as "player profiles 270"), network state information 275 (sometimes referred to herein as "game state information 275"), and one or more sets of network instructions 280. The data processing system 205 is shown as including one or more network sessions 261, one or more data structures 262, and one or more criteria 263.

Each of the components (e.g., the data processing system 205, the network 210, the client devices 220, components thereof, etc.) of the system 200 can be implemented using the hardware components or a combination of software with the hardware components of a computing system, such as the server 106, the client computing system 102, or the computing system 100 described in connection with FIGS. 1A-1D, or any other computing system described herein.

The data processing system 205 can include at least one processor and a memory, e.g., a processing circuit. The memory can store processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The data processing system 205 can include one or more computing devices or servers that can perform various functions as described herein. The data processing system 205 can include any or all of the components and perform any or all of the functions of the server 106, the client computing system 102, or the computing system 100 described in connection with FIGS. 1A-1D, or any other computing system described herein.

The network 210 can include computer networks such as the Internet, local, wide, metro or other area networks, intranets, satellite networks, other computer networks such as voice or data mobile phone communication networks, and combinations thereof. The data processing system 205 of the system 200 can communicate via the network 210, for example with one or more client devices 220. The network 210 may be any form of computer network that can relay information between the data processing system 205, the one or more client devices 220, and one or more information sources, such as web servers or external databases, amongst others. In some implementations, the network 210 may include the Internet and/or other types of data networks, such as a local area network (LAN), a wide area network (WAN), a cellular network, a satellite network, or other types of data networks.

The network 210 may also include any number of computing devices (e.g., computers, servers, routers, network switches, etc.) that are configured to receive and/or transmit data within the network 210. The network 210 may further include any number of hardwired and/or wireless connections. Any or all of the computing devices described herein (e.g., the data processing system 205, the one or more client devices 220, etc.) may communicate wirelessly (e.g., via Wi-Fi, cellular, radio, etc.) with a transceiver that is hardwired (e.g., via a fiber optic cable, a CAT5 cable, etc.) to other computing devices in the network 210. Any or all of the computing devices described herein (e.g., the data processing system 205, the one or more client devices 220, the server 106, the client computing system 102, the computing system 100, etc.) may also communicate wirelessly with the computing devices of the network 210 via a proxy device (e.g., a router, network switch, or gateway).

Each of the client devices 220 can include at least one processor and a memory, e.g., a processing circuit. The memory can store processor-executable instructions that, when executed by processor, cause the processor to perform one or more of the operations described herein. The processor can include a microprocessor, an ASIC, an FPGA, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. The client devices 220 can include one or more computing devices or servers that can perform various functions as described herein. The one or more client devices 220 can include any or all of the components and perform any or all of the functions of the client computing system 102 or the computing system 100 described in connection with FIGS. 1A-1D, or any other computing system described herein.

Each client device 220 can include, but is not limited to, a mobile device (e.g., a smartphone, tablet, etc.), a television device (e.g., smart television, set-top box, et.), a personal computing device (e.g., a desktop, a laptop, etc.) or another type of computing device. Each client device 220 can be implemented using hardware or a combination of software and hardware. Each client device 220 can include a display or display portion. The display can include a display portion of a television, a display portion of a computing device, or another type of interactive display (e.g., a touchscreen, a display, etc.) and one or more input/output (I/O) devices (e.g., a mouse, a keyboard, digital keypad). The display can include one or more portions, for example, to display multiple in-game events as described herein. The display can include a touch screen displaying an application, such as the gaming applications described herein. The display can include a border region (e.g., side border, top border, bottom border).

In some implementations, the display can display graphical content. The display may receive user interactions. For example, the display may be a touch screen display that can directly receive interactions or a computer display that can receive interactions through an object, such as a mouse. The interactions can result in interaction data, which can be stored and transmitted by the processing circuitry of the client device 220. The interaction data can include, for example, interaction coordinates, an interaction type (e.g., click, swipe, scroll, tap, etc.), and an indication of an actionable object with which the interaction occurred. The actionable object may be a graphical element displayed on the client device 220. As an example, the client device 220 can indicate a selection of a class (e.g., suit) to place a wager on based on transmitting interaction data that moves a graphical element to interaction coordinates associated with the class. In this example, the amount of the wager can depend on which graphical element is moved to the interaction coordinates associated with the class. For example, a set of graphical elements may display wager icons that each represent a different wager amount. Each client device 220 can include an input device that enables a player to interact with and/or select one or more actionable objects as described herein. For example, a touchscreen display can enable interaction with one or more visual indications provided through the display of each mobile (or client) device 220, and responsive to an interaction (e.g., select, click-on, touch, hover), the client device 220 can generate an indication identifying a player input and/or selection of a wager, an in-game event, or an indication to participate in a bonus event, among others.

Each client device 220 can include a device identifier, which can be specific to each respective client device 220. The device identifier can include a script, code, label, or marker that identifies a particular client device 220. In some implementations, the device identifier can include a string or plurality of numbers, letters, characters or any combination numbers, letters, and characters. In some implementations, each client device 220 can have a unique device identifier. Each client device 220 can include a client application, which can be a gaming application that communicates with the data processing system 205 to play games, as described herein. The client application can include an application executing on each client device 220 or provided to the client device 220 by the data processing system 205.

The application can include a web application, a server application, a resource, a desktop, or a file. In some implementations, the application can include a local application (e.g., local to a client device 220), hosted application, Software as a Service (SaaS) application, virtual application, mobile application, and other forms of content. In some implementations, the application can include or correspond to applications provided by remote servers or third-party servers. In some implementations, the application can access the network profiles 270, the network state information 275, or the network instructions 280, stored and maintained at the storage 215, and generate one or more actionable objects, such as the actionable objects (e.g., interactive objects) described herein below in connection with FIGS. 3A-5, to a user (sometimes referred to herein as a "player") through a client device 220. Such actionable objects can include player-selectable hyperlinks, buttons, graphics, videos, images, or other application features that generate a signal that is processed by the application executing on the respective client device 220.

The network sessions 261 can be executions of the application. For example, the application can be associated with network sessions 261 that represent individual executions of the application that each iteratively execute a set of operations until a termination condition is satisfied. The network sessions 261 may have different application conditions. For example, the network sessions 261 may have different probabilities that influence the outcomes of network interactions. In some implementations, the one or more network sessions 261 can be or include one or more application sessions (e.g., of the virtual application), an execution session, a desktop session, a hosted desktop session, a terminal services session, a browser session, a remote desktop session, a URL session and/or a remote application session, among others. Each network session 261 can include encrypted and/or secure sessions, which can include an encrypted file, encrypted data or traffic. Each client device 220 can use the network session 261 established with the data processing system 205 to carry out any of the functionalities described herein. For example, the application executing on each client device 220 can perform any of the client-side operations described herein, including displaying any of the user interfaces shown in FIGS. 3A-3G, or any other types of user interfaces described herein.

Each of the client devices 220 can be computing devices configured to communicate via the network 210 to access information resources, such as web pages via a web browser, or application resources via a native application executing on a client device 220. When accessing information resources (e.g., instructions/assets for displaying/presenting, modifying, or otherwise navigating graphical user interface (s), etc.) the client device 220 can execute instructions (e.g., embedded in the native applications, in the information resources, etc.) that cause the client devices 220 to display various application interfaces, such as the user interfaces described herein below in conjunction with FIGS. 3A-3G. The application interfaces can be, for example, application interfaces that present different types of network information, or other types of interactive graphical user interfaces.

In general, the graphical user interfaces may include various different types of interactive or non-interactive assets (e.g., images, video, animations, graphics, audio, etc.) that is presented to a user via the input/output interfaces of a client device 220. In some examples, graphical elements within respective interfaces displayed to each of client devices 220 within one of the network sessions 261 may be synchronized. For example, client devices 220 within the same network session 261 may display at least some graphical elements that display consistent appearance and location within the respective interfaces.

In response to interactions with user interface elements, the client devices 220 can transmit information, such as network profile information (e.g., changing profile parameters, changing login information, any information stored in a network profile 270, etc.), interaction information, selections of wager amounts, selections of gaming participation events, or other signals to the data processing system 205. Information transmitted by the client devices 220 may advance the state of gaming sessions (e.g., network sessions 261 associated with a network application comprising a game). Gaming sessions may advance to a subsequent stage based on receiving interaction information (e.g., selection of wager amounts) from the involved client devices 220. For example, an application state of a network session 261 may be updated to the execution state in response to receiving interaction information from client devices 220. As another example, application conditions of a network session 261 may be modified in response to receiving interaction information from client devices 220. For example, probabilities can be modified (e.g., application values can be removed) or special conditions can be met (e.g., stopper values can be revealed) in response to receiving interaction information. In this example, the interaction information may cause the network session 261 to satisfy a threshold, which may initiate the change in application conditions.

The data processing system 205 is shown as including the storage 215. The storage 215 can be a computer-readable memory that can store or maintain any of the information described herein. The storage 215 can maintain one or more data structures, which may contain, index, or otherwise store each of the values, pluralities, sets, variables, vectors, numbers, or thresholds described herein. The storage 215 can be accessed using one or more memory addresses, index values, or identifiers of any item, structure, or region maintained in the storage 215. The storage 215 can be accessed by the components of the data processing system 205, or any other computing device described herein, via the network 210. In some implementations, the storage 215 can be internal to the data processing system 205. In some implementations, the storage 215 can exist external to the data processing system 205 and may be accessed via the network 210. For example, the storage 215 may be distributed across many different computer systems (e.g., a cloud computing system) or storage elements and may be accessed via the network 210 or a suitable computer bus interface.

The data processing system 205 can store, in one or more regions of the memory of the data processing system 205, or in the storage 215, the results of any or all computations, determinations, selections, identifications, generations, constructions, or calculations in one or more data structures indexed or identified with appropriate values. Any or all values stored in the storage 215 may be accessed by any computing device described herein, such as the data processing system 205, to perform any of the functionalities or functions described herein. In implementations where the storage 215 forms a part of a cloud computing system, the storage 215 can be a distributed storage medium in a cloud computing system and can be accessed by any of the components of the data processing system 205, by the one or more client devices 220 (e.g., via the user interface similar to that depicted in FIGS. 3A-3G, etc.), or any other computing devices described herein.

The storage 215 can store one or more network sessions 261. Network sessions 261 may be started in response to a request from a client device 220 to execute an application. For example, in response to receiving the request from a client device 220, a network session 261 may be started. Alternatively, the client device 220 may be assigned to an existing network session 261. In an example, network sessions 261 may be based on other conditions, such as termination of other network sessions 261, at regular intervals of time, and/or based on engagement with the application (e.g., a number of user requests to execute the application). A network session 261 can include a record of one or more interactions between the client devices 220 and the data processing system 205. For example, a network session 261 can include record of wagers transmitted by client devices 220. A network session 261 may conclude when a termination condition is satisfied. At the conclusion of a network session 261, network profiles 270 associated with the client devices 220 that participated in the network session 261 may be updated. For example, the network profiles 270 may be updated based on user input from the client devices 220 received during the network session 261 and/or attributes of the application at the termination of the network session 261.

The storage 215 can store one or more network profiles 270 associated with a user (sometimes referred to herein as a "player") of a client device 220. In some implementations, the network profiles 270 may sometimes be referred to as "player profiles 270". A network profile 270 of a player can be a user profile that includes information about the player and information about one or more of the client devices 220 used to access the data processing system 205 using the network profile 270. For example, identifiers of the network profile 270 can be used to access the functionality of the data processing system 205 (e.g., by logging into the data processing system 205 via one or more web-based interfaces). The identifiers can include a username, a password, an e-mail address, a phone number, a personal identification number (PIN), a secret code-word, device identifiers for use in a two-factor authentication technique, among others. The network profile 270 can store information about wagers, games, and gaming events that are performed by the player via the data processing system 205. The network profile 270 can store a credit balance, wager information or side wager information (e.g., an amount of a wager/side wager, a timestamp associated with a wager/side wager, information about gaming conditions or game state information that resulted in a side wager, a client device identifier of a client device 220 that was used to place the wager/side wager, etc.). The network profile 270 can store information about a client device 220 used to access the data processing system 205 such as an IP address, a MAC address, a GUID, a network profile name (e.g., the name of a user of the client device 220, etc.), device name, among others. For example, the network profile 270 can store location information determined based on interactions between each client device 220 and the data processing system 205. In some implementations, the network profile 270 can be created by the data processing system 205 in response to the network profile creation request transmitted by a client device 220.

The network profile creation request can include any of the network profile information described herein.

The storage 215 can store or maintain network state information 275 associated with each of the one or more network profiles 270, for example, in one or more data structures. The network state information 275 can include information for interactive applications (e.g., desktop/network applications, remote desktop applications, interactive games, etc.) previously or currently accessed by a client device 220 using a corresponding network profile 270. In some implementations, a client device 220 accessing the data processing system 205 may not be associated with a network profile 270. In such implementations, the data processing system 205 can automatically create a network profile 270 using an identifier of the client device 220 provided by the client device 220. The network state information 275 can include any information relating to one or more network sessions 261 between a client device 220 and a data processing system 205. In some implementations, the network state information 275 can include state information for one or more network applications provided by the data processing system 205 to a client device 220. For example, the network state information 275 can include information relating to wagers, additional/side wagers, hands, actions, progression, interactions, or other data provided by the client device 220 during a play of a game or according to any other network application provided by the data processing system 205. As described in further detail herein, the state manager 240 can maintain (e.g., store, update, etc.), in corresponding network state information 275, a respective network state of applications as they are being accessed for multiple users accessing the data processing system 205. The network state information 275 can include one or more data structures that include any information related to a network state, including any values or data stored for an application instance accessed via a network session 261. In an example of a game, the network state information 275 can include information such as progression/state of a tile (e.g., representing a class/card/suit/symbol), wager information, how many stopper values have been revealed, or any other state data described herein.

In some implementations, the network state information 275 can include information relating to progression of representative tiles that represent a set of classes within a set of sequential positions. For example, the application can display a set of sequential positions. Representative tiles may progress within the set of sequential positions as matching application value pairs are selected from a pool of application value pairs. In an example, the application value pairs may be tiles that indicate a class, and may be determined to match a representative tile when a class (e.g., suit) and/or corresponding value (e.g., card face value) of the tiles match. A representative tile may satisfy a win condition of a network session 261 when it reaches a final position in the set of sequential positions. The network state information 275 can include a position of each representative tile and the application value pairs in the pool of application value pairs. In some examples, application value pairs may be removed from the pool to dynamically change application conditions. In these conditions, the network state information can include the removed application value pairs and remaining application value pairs in the pool.

In an example, the data processing system 205 can determine a probability of whether each representative tile will win a network session 261. This probability can be based on the pool of application value pairs. The network state information 275 may be updated with new probabilities in response to application value pairs being removed from the pool of application value pairs. In some implementations, the application may include other values that can affect the execution of the application. For example, the application can include a set of stopper values. A stopper value can be revealed in response to the tiles satisfying an associated threshold (e.g., a threshold position in the set of sequential positions). In an example, stopper values may be tiles that indicate a class. Once a stopper value has been revealed, the respective tile that matches the class of the stopper value may be reversed by one position. The network state information 275 can include information such as the classes of the stopper values and which stopper values have been revealed.

The storage 215 can store or maintain network instructions 280. The network instructions 280 may include various instructions for one or more network applications that may be accessed at/provided by the data processing system 205. The network instructions 280 may include instructions for modifying the network state information 275 for a given network session 261. The network instructions 280 may include instructions to receive, transmit, and/or generate one or more data structures 262. In some implementations, the network instructions 280 may include instructions that compare various values stored as part of the network state information 275 to one or more criteria 263. The criteria 263 may include thresholds, conditions, values, path information, or other comparison information used by one or more network applications provided by the data processing system 205. For example, the criteria 263 can include one or more security criterion. The security criteria 263 can include one or more conditions for assigning client devices 220 to network sessions 261 (e.g., location proximities, etc.).

In some implementations, the network instructions 280 can include display/presentation instructions, which may specify various assets, network configuration information, or other information used to provide various network applications to the client devices 220. The network instructions 280 can include instructions to play various games (e.g., poker games). The network instructions 280 can specify one or more game events that occur in response to a particular game state. The network instructions 280 can include instructions to play a game from start to finish, for example, by streaming gaming content to each of the client devices 220 that initiate play of a particular game, or by executing the network instructions 280 and displaying content via a local display device. The network instructions 280 can be stored in one or more data structures that are indexed by a game name (e.g., blackjack, poker, rummy, craps, sic bo, Klondike, any other game, etc.). The network instructions 280 can be processor executable instructions that cause the data processing system 205 to provide one or more games to a client device 220 via a communication session.

In some implementations, the network instructions 280 can include conditions that trigger events within a network session 261. For example, the network instructions 280 can include a removal condition. In response to determining that an application state of a network session 261 satisfies the removal condition, application value pairs from the pool of application value pairs may be removed. In an example, the removal condition may be the start of a network session 261. In another example, the removal condition may be another attribute, such as a number of application value pairs that have been revealed. This can dynamically change application conditions within the network session 261. As another example, the network instructions 280 can include stopper value conditions. In response to determining that an applications state of a network session 261 satisfies a stopper value condition, a stopper value may be revealed. In an example, a stopper value condition may be a position in the set of sequential positions. In this example, the network instructions may include a plurality of stopper value conditions that are associated with a plurality of stopper values. As yet another example, the network instructions 280 can include conditions for starting and termination a network session 261. For example, the network instructions 280 can include instructions to start a network session 261 in response to receiving a request from a client device 220 to execute the application. Similarly, the network instructions can include instructions to terminate a network session 261 in response to a representative tile satisfying a termination condition.

In some implementations, the network instructions 280 can include artificial intelligence models (e.g., machine learning models, neural network, decision trees, ruled-based lookup table, etc.) that cause the data processing system 205 to play an opposing entity to a player of one of the games in the network instructions 280. For example, the artificial intelligence model can provide a simulated dealer in a blackjack game, a simulated player in a poker game, or other simulated players, dealers, or game entities. In some implementations, the network instructions 280 can include network instructions that allow a play of a game to progress with multiple hands. For example, in a multi-hand card game, the network instructions 280 can include instructions that accommodate multiple hands being controlled by a single player.

The network instructions 280 can include, or may include instructions for generating odds information, which can be stored as probability values of certain in-game events occurring. The odds information may further define one or more probability distributions that may be sampled to determine an outcome of one or more events in the game according to the network instructions 280. In some implementations, the odds information may be altered based on actions taken by the player, or the odds information can correspond to the likelihood of one or more outcomes (e.g., an expected value of player loss, an expected value of player win, etc.). For example, the odds may define the probability of a representative tile winning a network session 261 of the application. Odds may also define the probability of different attributes of the application state being true for a network session 261 once it is terminated. For example, odds may define a probability that a certain number of application value pairs are selected in the network session 261. In some examples, odds may be displayed to the client devices 220. In an example, payouts of an accurate wager can be determined based on the odds information.

In some implementations, odds information may be changed dynamically within a network session 261. For example, odds information may depend on a pool of application value pairs. In an example, the pool of application value pairs may be a deck of cards with a set of numerical values (e.g., the aces) removed. Initially, there may be an equal probability of selecting a card of a certain suit from the pool of application value pairs. However, in some examples, cards may be removed, either at the start of a network session 261 or during a network session 261 due to a removal condition being satisfied. The network instructions 280 may include instructions to update odds information in response to cards being removed from the pool of application value pairs.

In some implementations, where the network instructions 280 provide instructions for a game that implements a side wager, the network instructions 280 can specify the conditions under which the player is able to place the side wager and the conditions under which the player is to be awarded with awards according to a side wager when a corresponding side wager condition is met (e.g., at game termination, on player win, on player loss, etc.). Each of the components of the data processing system 205 can access, update, or modify the network profiles 270, the network state information 275, or the network instructions 280, to carry any of the functionalities described herein.

Referring now to the operations of the data processing system 205, the device communicator 230 can establish a network session 261 (sometimes referred to herein as a game session) with a client device 220 in response to a request from the client device 220. Establishing the network session 261 may include generating network state information 275 for the network profile 270 used to access the data processing system 205 to initiate a play of a selected game. The request to establish a game session may include a request to play a game, which may be received in one or more messages from an application executing on each client device 220. The message, or request, can indicate that a player intends to play a game provided by the data processing system 205. The message can include an indication of a network profile 270 for use in connection with the functionalities related to the game (e.g., placing wagers using earned credits, purchasing additional credits, etc.).

The message can include an identifier of a particular game to play. In some implementations, the device communicator 230 can provide the client device 220 with instructions to display one or more games to play in a list, allowing the player to select a game from the list. In response to an interaction indicating a selection, the client device 220 can transmit a signal identifying a game to the data processing system 205. Using the selection, the data processing system 205 can communicate a user interface for the game generated according to the game instructions 280 for the game and the network state information 275 for the game session. Such graphical user interfaces are shown in FIGS. 3A-3G.

A play of the game can be a single iteration or a set of iterations that are executed until a termination condition is met. To initiate a play of the game, or during a play of the game, the device communicator 230 can receive one or more network communications/requests that include data structures 262 specifying wagers from the client device 220 (e.g., in response to movement of corresponding user interface elements presented at the client device 220, as described herein). The wager(s) may specify a wager amount. The wager amount provided by the client device 220 can be specified amounts of credits, such as 2, 5, 25, 200, 500, or 2000 credits. For example, the wager amount may be based on a wager icon associated with one of the amounts of credits that has been moved to a region of the display that is associated with a wager by the client device 220. In some implementations, the player can specify a custom number or fractional number of credits used in the game, each of which may correspond to a respective condition, outcome, or aspect of the game. In some implementations, the wagers may include side wagers, additional wagers, or other wagers placed prior to or during a play of the game.

The client device 220 (or an application executing on the client device 220) can receive data relating to the requested game from the device communicator 230. The data relating to the requested game can include or may be generated based on network state information 275, which can be maintained by the state manager 240, as described herein. The device communicator 230 may determine updated information to provide to the client device 220 based on the network state information 275 for the game, which is initialized and updated by the state manager 240.

The state manager 240 updates and maintains the network state information 275, which may refer to the current state of one or more network applications described herein. In some implementations, the network state information 275 can maintain a state of a card game, a slot machine game, or a roulette game, including the current state of the roulette wheel, the bets placed by player(s), the payout odds for each bet, the active bonus regions, and the outcome history of previous spins. The state manager 240 can maintain the outcome of each gameplay (e.g., win or loss) and whether the current play satisfies any predetermined bonus conditions based on the outcome. The state manager 240 can update the network state information 275 based on player interactions and network instructions 280. For example, the state manager 240 can update the network state information 275 when the submits a new side wager, and/or the like. Similarly, the state manager 240 can update the network state information 275 based on events of the network application, such as a reveal of a stopper value.

The profile manager 250 can create, modify, or delete network profiles 270 stored within storage 215. The profile manager 250 can store and organize player information, including account details, preferences, and gaming history, among others. The profile manager 250 can generate profile information based on data received from the client devices 220. This allows the profile manager 250 to capture activity across different gaming applications and different devices, and store records of that activity in the network profile 270. The profile manager 250 can provide gaming statistics (e.g., historical game outcomes), and game progress to a requesting client device 220.

The profile manager 250 can update credit balances, game statistics, and other relevant information based on the outcomes of games played by a client device 220. The profile manager 250 can receive data about game results from the client devices 220 or the state manager 240 and use this information to make adjustments to the network profile 270. For example, if a player wins a card-based game with a $10 wager, the profile manager 250 can increase the credit balance of the corresponding network profile 270 by an award amount (the amount of the wager modified by the odds of the wager). Similarly, the profile manager 250 can record game statistics such as the number of wins, losses, and ties, as well as the player's average bet size, win percentage, and longest winning streak. This allows players to track their progress and review their gaming history.

Although the foregoing has been described in a client-server arrangement, it should be understood that in some implementations, the data processing system 205 may locally execute one or more of the network applications. In such implementations, player profiles 270 may be maintained and/or accessed via one or more remote servers via the network 210. In such implementations, the data processing system 205 can include one or more display devices to present various graphical user interfaces described herein, as well as any suitable input device (e.g., buttons, switches, actuators, etc.) to receive input to interact with the applications provided via the data processing system 205. In some implementations, the data processing system 205 can include one or more physical receptacles, which may receive physical wager items (e.g., cards, chips, tokens, etc.) to enable users to provide wagers for various game applications provided via the data processing system 205.

Referring now to an example implementation of a card-based game, the data processing system 205 can receive a request to execute the application from a client device 220. In response to receiving the request, the data processing system 205 may either create a network session 261 or add the client device 220 to an existing network session 261. The existing network session 261 may be a network session 261 that is currently being executed (e.g., has started) or a network session 261 that is waiting to start. In some examples, a network session 261 may be started based on a condition. For example, a network session 261 may be started (e.g., updated to an execution state) in response to receiving a threshold number of wagers or a wager from each client device 220 assigned to the network session 261. The wagers can predict a class that will win the network session 261. In an example, the wagers can be associated with the network profiles 270 of the client devices 220. For example, each network profile 270 can store a value representing an amount of credits. In this example, client devices 220 may place wagers up to the amount of credits in their associated network profiles 270.

The application may be a card-based game, where icons representing a set of classes advance within a set of sequential positions (e.g., a track), and the winning class is determined based on which icon reaches the final position (e.g., the finish line) first. The application may be based on a set of tiles. In some examples, the set of tiles may correspond to a deck of cards (e.g., a standard deck of 52 cards). For example, each tile may represent a card in the deck of cards. The set of classes may be the suits within the deck of cards, and the icons that represent the set of classes may be a set of cards of the same value (e.g., the set of aces). These cards may be removed from the deck and displayed at the respective interface to the client device 220. The remaining cards in the deck may represent a pool from which cards can be selected to determine movement of the icons within the set of sequential positions. For example, within a network session 261, iterations of the application may be executed until a card that represents one of the suits reaches the finish line. At each iteration, a card may be selected from the pool. The card representing the class that matches the class of the selected card may then be moved forward one position. In some examples, client devices 220 may place side wagers during the iterations of the application. The side wagers can predict various game conditions, such as how many cards are selected before one of the cards representing the classes reaches the finish line. During the network session 261, the client devices 220 may also place additional wagers on which suit will win the network session 261. Additional wagers may be placed in addition to or in place of the initial wager on which suit will win.

In some implementations, the application can also include stopper cards. For example, the application can include a stopper card associated with each position in the set of sequential positions, except for the final position. When all of the tiles have reached a position, the corresponding stopper card may be revealed. The card that represents the suit of the stopper card can then be moved back one position. The stopper cards may be assigned at the beginning of the network session 261 and can be displayed facedown until certain game conditions are met. In an example, the stopper cards may be selected from the pool of cards and therefore may affect which cards remain in the pool. In other examples, the stopper cards may be selected from a different deck of cards and may therefore not affect the pool that cards are selected from during iterations of the application.

In some implementations, cards may be removed from the pool of cards to dynamically change conditions of a network session 261 of the application. For example, the card associated with a certain suit may be more likely to advance first to the finish line if there are more cards of that suit within the pool of cards. Cards may be removed from the pool at the start of a network session 261. In an example, client devices 220 may be provided the opportunity to submit initial wagers on which suit will win the network session 261 before and/or after cards have been removed at the start of a network session 261. Additionally, or alternatively, cards may be removed from the pool during the network session 261 based on application conditions. For example, cards may be removed from the pool in response to determining that the network session 261 satisfies a removal condition. The removal condition may indicate a condition of the network session 261, such as the number of stopper cards that have been revealed, the total amount that has been submitted as wagers, the number of cards that have been selected from the pool, and/or the like. As a result of changing application conditions by removing cards from the pool before and/or during a network session 261, the data processing system 205 can reduce predictability between network sessions 261. This can increase engagement of client devices 220 with the network session 261. Furthermore, it can increase fidelity in network sessions 261 of the card-based game. For example, the network sessions 261 may depend on low predictability (e.g., random odds) for unbiased placement of wagers. Minimizing the predictability of the application can enhance the security of network sessions 261 by mitigating potential vulnerabilities.

In some implementations, information about application conditions may be displayed on the client devices 220. For example, when cards are removed from the pool of cards to change the application conditions, the cards that have been removed may be displayed at the respective interface presented to the client devices 220. In some examples, the respective interface may display odds associated with various wagers. Based on the suits of the cards in the pool, some of the cards may be more likely to advance than other cards. For example, if there are more cards that indicate the suit of clubs in the pool, the card that represents that suit of clubs may be more likely to advance within the set of sequential positions. In an example, the odds may be updated throughout the network session 261. For example, the odds may be updated in response to cards being removed from the pool. Additionally, or alternatively, the respective interface can indicate which classes the client devices 220 have placed wagers on (e.g., a percent of total wagers that have been placed on each class) and how much the client devices 220 have wagered on each class (e.g., a percent of the total wager amounts that have been placed on each class.

In some implementations, the network session 261 may terminate when one of the cards representing the suits reaches the final position in the set of sequential positions. For example, each time a card advances, the data processing system 205 can determine if the card satisfies the termination condition. In response to determining that the card does satisfy the termination condition, the network session 261 may be updated to a termination state. The data processing system 205 may then determine credits to be awarded and/or subtracted from the network profiles 270 associated with the client devices 220. For example, the data processing system 205 can subtract wager amounts associated with wagers that were not accurate from the network profiles 270. The data processing system 205 can also credit an amount associated with wagers that were accurate based on the associated wager amount and odds of the wager. As an example, a wager associated with low odds may result in a larger credited an amount than a wager associated with high odds, even if these wagers have the same wager amount. Example graphical user interfaces showing an example implementation of a card-based game are shown in FIGS. 3A-3G.

Referring now to FIG. 3A in the context of the components described in connection with FIGS. 1A-D and 2, a graphical user interface 300 is presented on a client device for executing an iterative network application. For example, the client device may be a client device from the client devices 220, such as client device 220a. In this example, the graphical user interface 300 may be associated with a network session to which a group of client devices 220 have been assigned. The network session may be an execution of an application that implements a card-based game. As discussed above, the device communicator 230 can facilitate communication between the client devices 220 and the data processing system 205, allowing players to interact with a graphical user interface 300 and transmit their actions to the data processing system 205. As players engage (e.g., via client devices 220) with the graphical user interface 300, their actions, such as wagers, may be captured and stored in their network profile 270.

The graphical user interface 300 displays an interface for the iterative network application. The graphical user interface displays representative tiles 310 that represent a set of classes (e.g., suits). The graphical user interface also displays an icon representing a pool of tiles 306 from which tiles can be selected and revealed during iterations of the game. As depicted here the pool of tiles are the same type of icon as the representative tiles 310 (e.g., a playing card). However, in alternative examples, the pool of tiles 306 can be a pool of application value pairs that display a different type of icon with values that correspond to the representative tiles 310. Based on tiles selected from the pool of tiles 306, the position the representative tiles 310 may change on a track 308. For example, based on the suit (e.g., identifier value) of the selected tile 304, the position of one of the representative tiles 310 may be advanced. This process may be repeated until one of the representative tiles 310 reaches the final position 308f, at which point the suit corresponding to that representative tile will be designated as having won the network session.

In some implementations, wagers may be placed on which representative tile 310 will be the first to advance to the final position 308f and therefore win the network session. For example, the graphical user interface may display wager icons 314. The client device 220a may transmit an indication of a wager using the wager icons 314. In an example, the wager icons may be interactive icons that can be dragged cross the graphical user interface. For example, as depicted, the client device 220a may transmit input that moves the wager icons 314a to a spades wager region 320 to indicate a wager on spades tile 310a. In this example, the client device 220a may indicate a particular wager amount. For example, different icons in the wager icons 314 may correspond to wager amounts of 1, 5, 10, 20, 50, or 100 (e.g., dollars), respectively. In this example, wager icons 314 may display a color that indicates the corresponding denomination. In some examples, the user input may indicate a wager on a plurality of representative tiles. As an example, a wager may be placed on both the spades tile 310a and the diamonds tile 310d. In an example, the user input may indicate a wager amount of an icon along with a change in placement of the icon within the graphical user interface 300. For example, the user may indicate a wager amount of an icon by typing a number, selecting a button, and/or the like. Additionally, or alternatively, the wager icons 314 may display a plurality of wager icons each corresponding to the different wager amounts. In this example, the user may specify a wager amount by selecting a corresponding wager icon from the wager icons 314. In response to receiving input that moves the wager icons 314a to the spades wager region 320, a wager on the spades tile 310a winning may be stored in a network profile 270 that corresponds to the client device 220a. The wager stored in the network profile 270 may be associated with a wager amount represented by the wager icons 314a. For example, as depicted in FIG. 3, three wager icons are placed within the spades wager region 320. In an example, the three wager icons may each represent $25. As a result, the total wager placed on the spades tile 310a may be $75. In some examples, information related to wagers may be presented on the graphical user interface 300. For example, a wager ledger 322 may present a total balance associated with the network profile 270 that correspond to the client device 220a (e.g., $5,000.60) and a total amount of the wagers that the client device 220a has placed during the network session (e.g., $75.00). The client device 220a may be able to place wagers up to the amount of the total balance. In an example, the total amount of the wagers may be updated as subsequent wagers are placed and/or the total balance associated with the network profile 270 may be updated based on the outcome of the network session.

In some implementations, the odds display 312 can indicate information about odds and wagers that have been collectively placed by the client devices 220. For example, the odds display can indicate what percentage of the bets have been placed on each representative tile 310. As an example, the odds display can indicate that 41% of wagers have been placed on the spades tile 310a. In this example, 41% may indicate 41% of a number of total wagers on a winning representative tile have been placed on the spades tile 310a or 41% of a total wager amount of those wagers on a winning representative tile have been placed on the spades tile 310a. The odds display can also display odds of each representative tile 310. For example, the odds display 312 can indicate the odds of each representative tile 310 winning the network session. The odds of each representative tile 310 may be based on the suits present in the pool of tiles 306. For example, the higher the number of tiles associated with a suit that there are in the pool of tiles 306, the greater the probability is that the next selected application value pair is that suit. The tile representing that suit may therefore have better odds of winning the network session. In some examples, the odds may be displayed as American odds (e.g., +200) or European odds (e.g., 3.00). In these examples, the client device 220a may change how the odds are displayed by selecting options button 326. For example, the graphical user interface 300 can display graphical elements that provide the option to select settings, including an odds type, in response to the user device selecting the options button 326. In some examples, the client device 220a may be able to view more detailed odds information. For example, the client device 220a may select odds button 328 to view more detailed odds information. In this example, the detailed odds information can include a number of tiles associated with each suit present in the pool of tiles 306, a total wager amount that has been placed by client devices 220 associated with the network session on each of the representative tiles 310, and/or the like.

In some examples, the network application can modify the odds of the tiles by removing discard tiles 324 from the pool of tiles 306. For example, the network application may dynamically determine a set of odds associated with each network session by removing the discard tiles 324 from the pool of tiles 306 at the start of the network session or during the network session. In an example where the discard tiles 324 are removed during the network session, they may be removed at random (e.g., based on a random timer) or on game conditions. As an example, the discard tiles 324 may be removed from the pool of tiles 306 in response to a tile representing one of the classes advancing past a threshold position of the track 308. The number of tiles that are removed may be predefined, random (e.g., based on a random number generator), and/or based on conditions of the network session. In an example, the network application may determine and display the odds in the odds display 312 in response to removing the discard tiles 324 tiles from the pool of tiles 306 at the start of the network session. The network session may then allow client devices 220 associated with the network session to place wagers based on the odds in the odds display 312. In an example where the network application removes tiles during the network session, the network application may update the odds in the odds display in response to removing tiles during the network session.

Figure 3B:
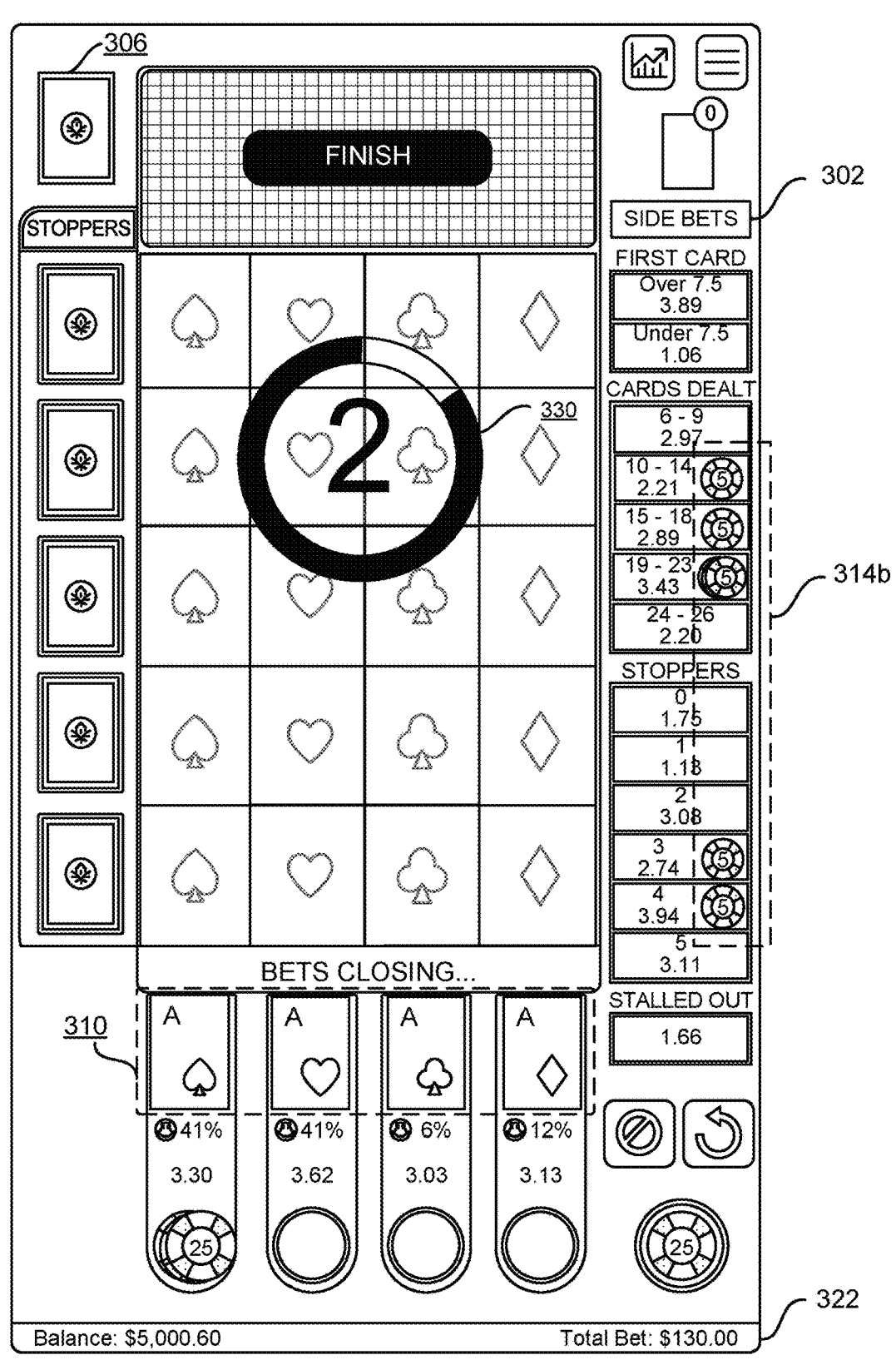

Referring to FIG. 3B in the context of the components described in connection with FIG. 2, an updated graphical user interface 300 is presented on the client device 220*a* in response to determining that a start condition has been met for the network session. The start condition may be a threshold number of wagers, a threshold wager amount (e.g., in dollars) associated with the wagers, a threshold amount of time since the network session was created, and/or the like. In response to determining that the network session satisfies the start condition, the network application may start a timer and display this timer as countdown timer 330. For example, the network application may allow client devices 220 to continue to place bets until the countdown timer 330 indicates that the time allotted by the countdown timer 330 has expired. In this example, the network session may not allow other wagers to be placed after the countdown timer 330 has expired. In an example, the network session may allow wagers to be placed after certain events, such as tiles being discarded from the pool of tiles 306 during the network session to dynamically change the odds.

In some implementations, the side wagers can be placed on the side wager display 302. For example, the client device 220*a* can place wagers side wagers in addition to or in place of wagers on which of the representative tiles 310 will win the network session before the countdown timer 330 expires. In an example, the side wager display 302 may present a set of options that client devices 220 can place wagers on. As an example, wagers can be placed on the number of tiles that are selected before one of the tiles is determined to have won, how many stopper values are revealed, and/or a number associated with a tile 304 that is selected, and/or whether a network session satisfies a stall condition (e.g., "stalls out"). A network session may stall out when all tiles from the pool of tiles 306 have been dealt and none of the representative tiles 310 have won the network session. Similar to the odds display 312, wagers may be placed by dragging wager icons 314 to the side wager display 302. As an example, the client device 220*a* may place wagers on the number of cards that will be dealt in the network session and a number of stopper cards that will be revealed by dragging wager icons 314*b* to the section of the side wager display 302 that is associated with those wagers. As illustrated in FIG. 3B, the client device 220*a* has indicated side bets including a $5 wager on 10-14 cards being dealt, a $5 wager on 15-18 cards being dealt, a $35 wager on 19-23 card being dealt (e.g., represented by two $5 wager icons and a $25 wager icon), a $5 wager on three stopper cards being revealed and a $5 wager on four stopper cards being revealed. In an example, the wager total indicated in the wager ledger 322 may be updated to include wager amounts placed on the side wagers. As an example, the client device 220*a* has indicated side wagers totaling $55, in addition to the $75 wager on the spades tile 310*a* winning the network session. As a result, the wager ledger 322 may be updated to display $130 as the total wager amount.

Figure 3C:
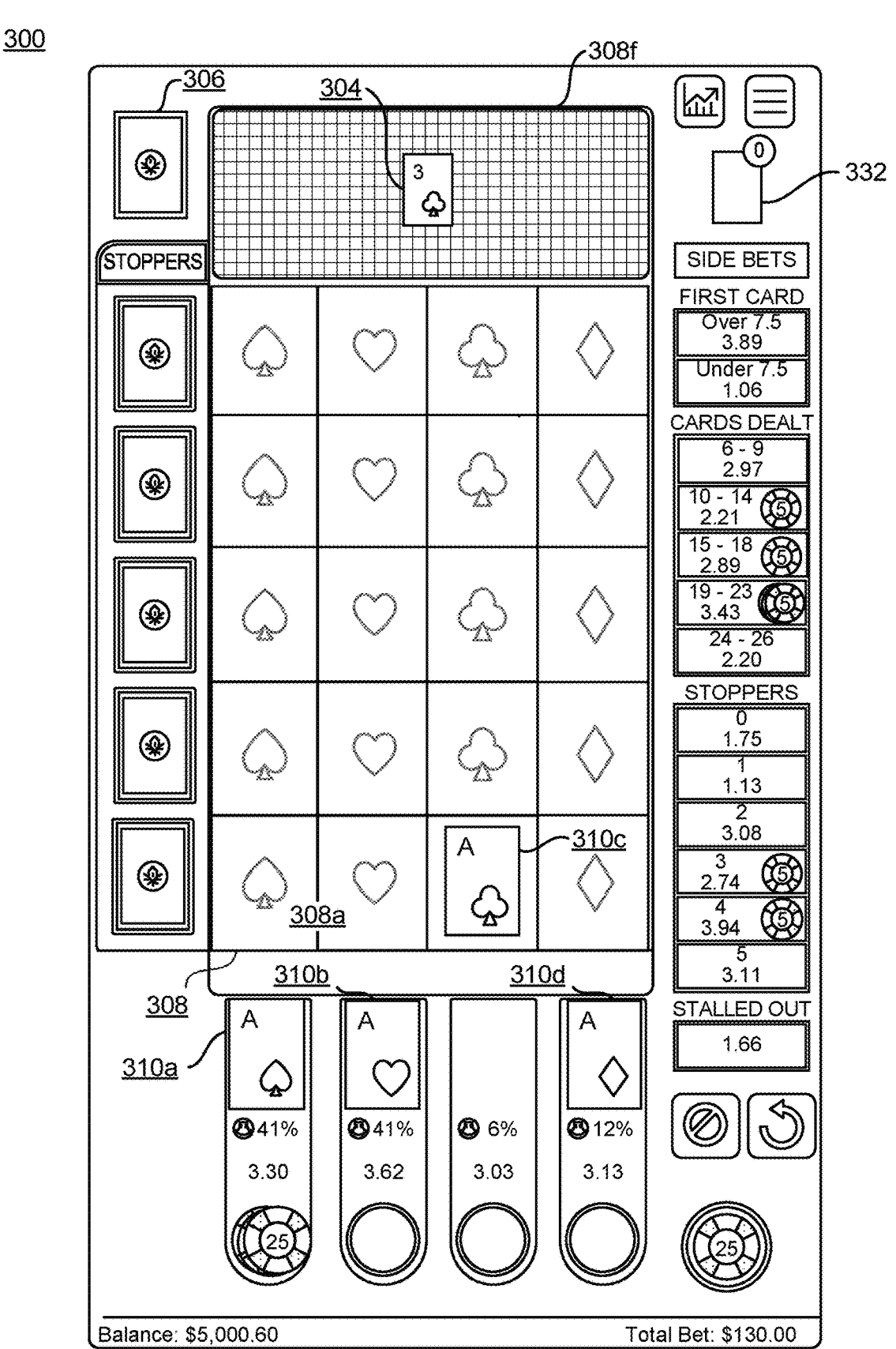

Referring now to FIG. 3C in the context of the components described in connection with FIG. 2, an updated graphical user interface 300 is presented on the client device 220*a* in response to a selecting the tile 304 as a first selected tile from the pool of tiles 306. The representative tiles 310 include the spades tile 310*a*, hearts tile 310*b*, clubs tile 310*c*, and diamonds tile 310*d*. The representative tiles 310 that correspond to a suit of tiles selected from the pool of tiles 306 may advance on the track 308. For example, the tile 304 displays the suit of clubs. The corresponding clubs tile 310*c* may therefore advance to the first position 308*a* on the track 308 based on the tile 304. The track 308 may include a series of sequential positions, the last of which is designated as a final position 308*f* (e.g., finish line) of the track 308. The first tile to advance to (e.g., be placed on) the final position 308*f* of the track 308 may be determined to satisfy a win condition of the network session. In an example, a pool of dealt tiles 332 may be updated to reflect the tiles that have been selected from the pool of tiles 306. For example, a counter displayed as part of the pool of dealt tiles 332 may be updated to "1" and the pool of dealt tiles 332 may display a three of spades after the tile 304 has been selected from the pool of tiles 306 and displayed to client devices 220.

Figure 3D:
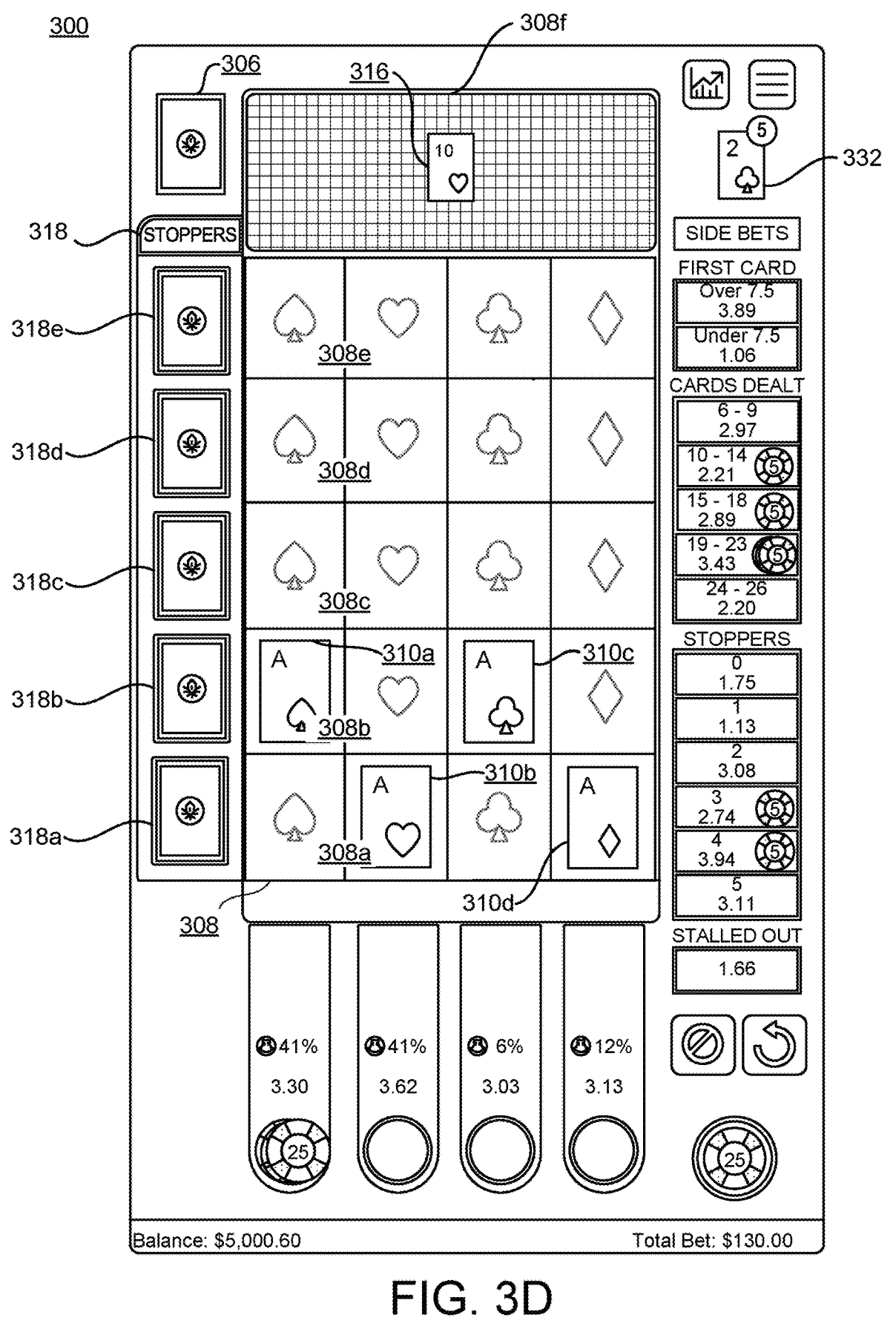

Referring now FIG. 3D, in the context of the components described in connection with FIG. 2, an updated graphical user interface 300 is presented on the client device 220*a* in response to selecting tile 316 from the pool of tiles 306. The graphical user interface 300 displays a state of the network session after several tiles (e.g., five tiles, as indicated by the pool of dealt tiles 332) have been selected from the pool of tiles 306. Based on the tiles that have been selected, the representative tiles 310 have changed position on the track 308. The track 308 may include positions 308*a*-308*f*. Each tile may advance one position on the track 308 based on a matching tile being selected from the pool of tiles 306. For example, based on the selected tile 316 displaying the suit of hearts, the hearts tile 310*b* may be advanced to the second position 308*b* on the track 308.

In some implementations, the graphical user interface 300 may include stopper values 318. For example, the stopper values 318 can include stopper values 318*a*-318*e* that correspond to positions 308*a*-308*e* on the track 308. The stopper values 318 may be revealed based on a state of the network session. For example, a first stopper value 318*a* may be revealed based on each of the representative tiles advancing to (e.g., or past) the first position 308*a* on the track 308. Similarly, a second stopper value 318*b* may be revealed based on each representative tile 310 advancing to and/or past the second position 308*b* of the track 308. There may be stopper values 318 associated with each position of the track 308 except for the final position 308*f*.

Figure 3E:
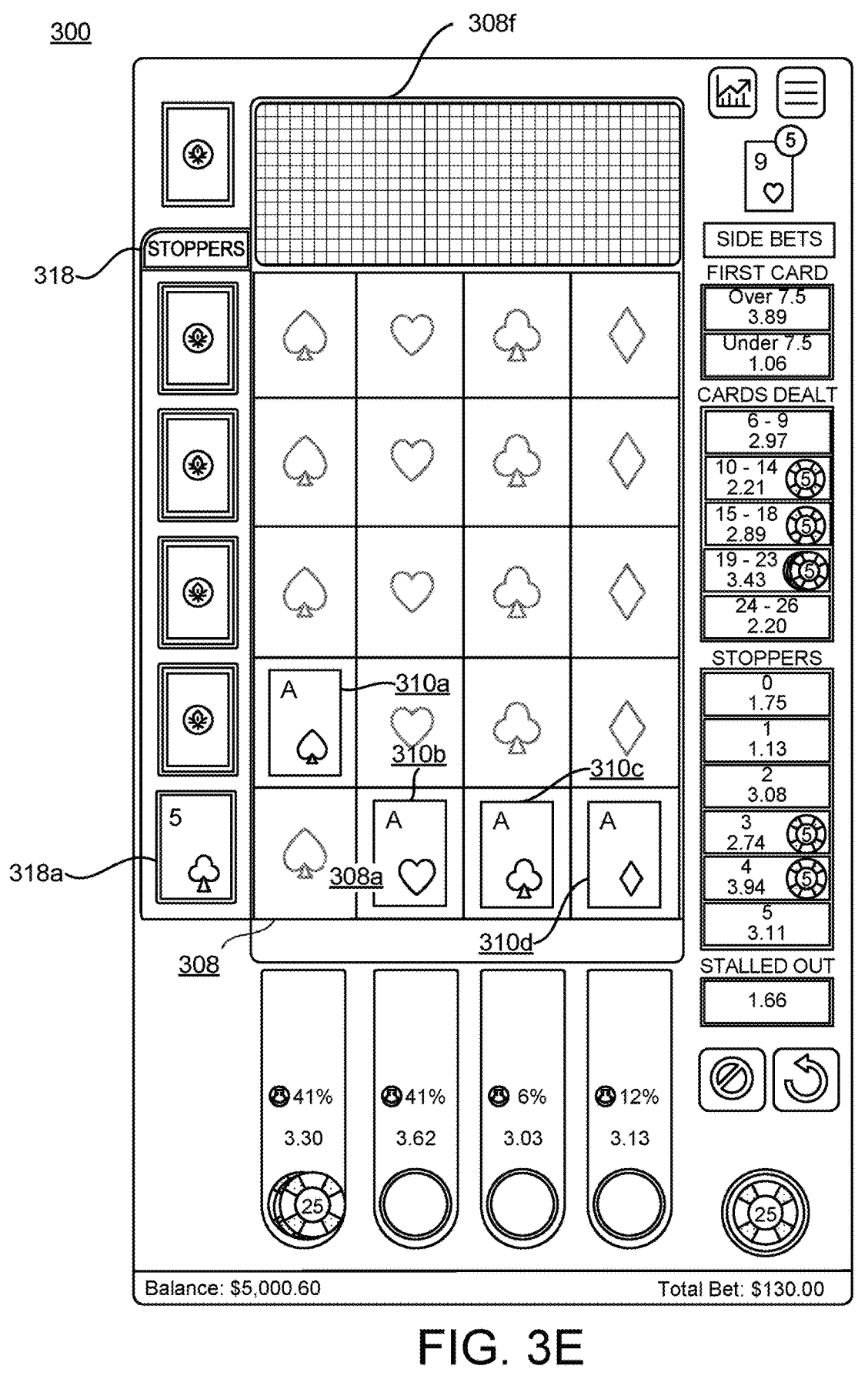

Referring to FIG. 3E in the context of the components described in connection with FIG. 2, an updated graphical user interface 300 is presented on the client device 220*a* in response to revealing the first stopper value 318*a*. The first stopper value 318*a* may be revealed in response to the representative tiles 310 advancing to and/or past the first position 308*a* on the track 308. For example, as depicted in FIG. 3B, in response to the hearts tile 310*b* advancing to the first position 308*a*, the first stopper value 318*a* may be revealed. The position of a tile that matches the suit of a stopper card may then be reversed by one position. For example, in response to the first stopper value 318*a* displaying the suit of clubs, the clubs tile 310*c* may be reversed by one position back to the first position 308*a*.

Figure 3F:
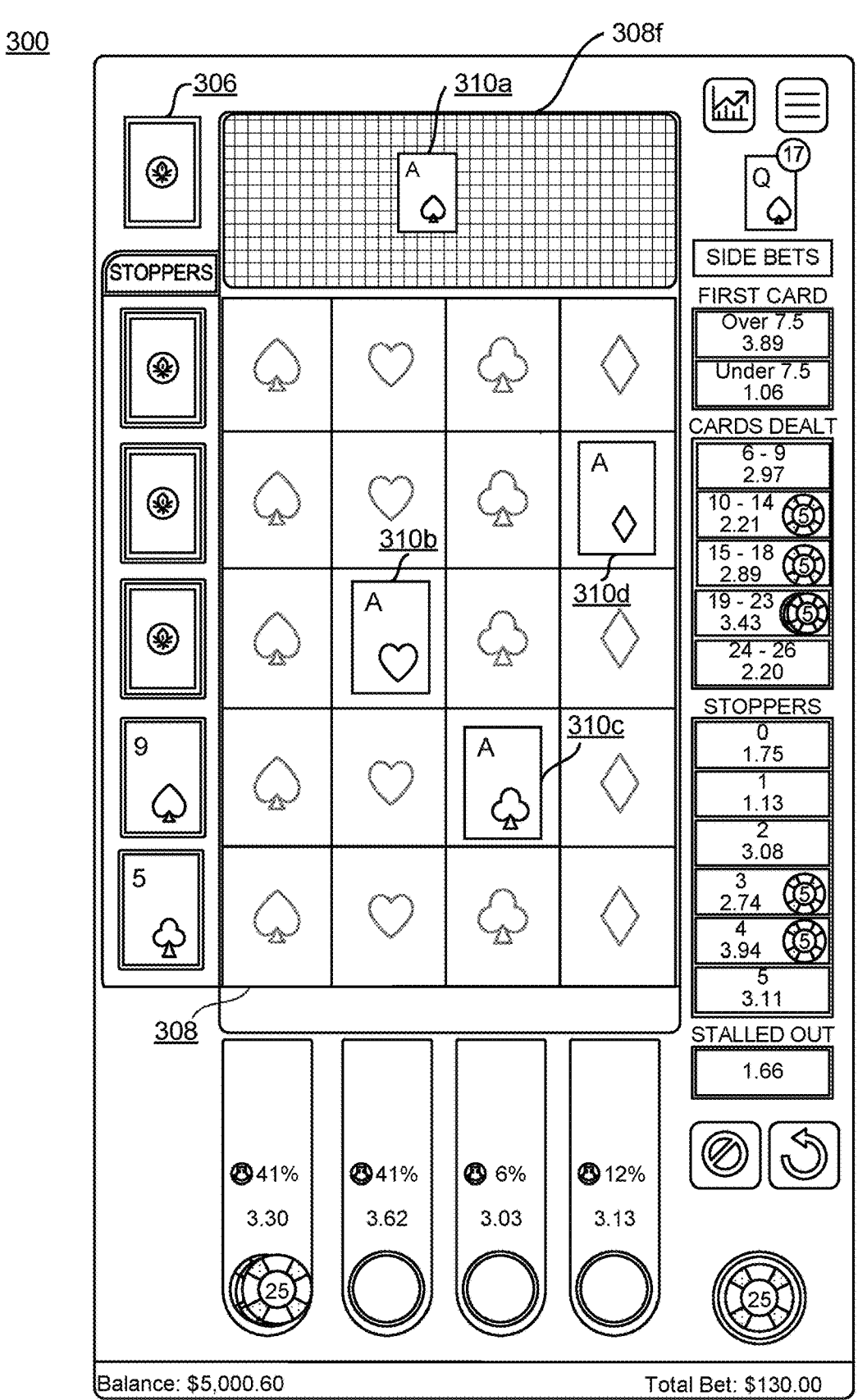

Referring to FIG. 3F in the context of the components described in connection with FIG. 2, an updated graphical user interface 300 is presented on the client device 220*a* in response to a representative tile reaching the final position 308*f* of the track 308. For example, the suit of the tile that satisfies the win condition (e.g., a "winning suit") may be determined based on which representative tile 310 reaches the final position 308*f* of the track 308 first. As an example, in response to the spades tile 310*a* being the first of the representative tiles 310 to reach the final position 308*f*, clubs may be determined as the winning suit. The network application can then determine payouts according to clubs being determined the winning suit and one or more attributes of the network session associated with the side wagers. In some examples, the network session may stall out before a representative tile reaches the final position 308*f*. For example, the network application may deal all of the cards in the pool of tiles 306 without any of the representative tiles 310 reaching the final position 308*f*. If the network session stalls out, it may end without a suit being designated as a winner. As a result, the network application may subtract wagered amounts associated with side wagers from network profiles associated with the client devices and/or determine and display payouts associated with side wagers.

Figure 3G:
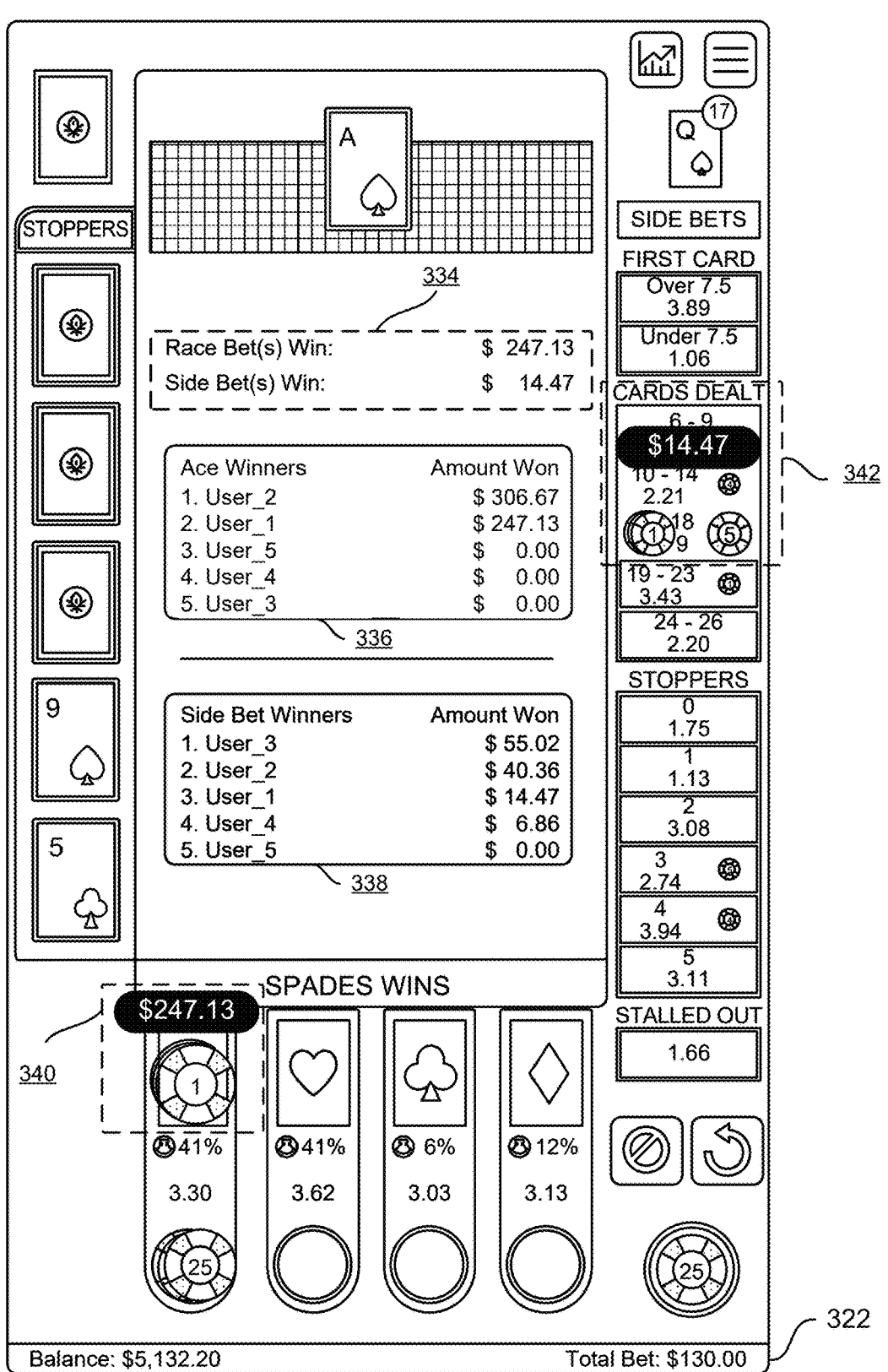

Referring to FIG. 3G in the context of the components described in connection with FIG. 2, an updated graphical user interface 300 is presented on the client device 220*a* in response to one of the representative tiles winning the network session. For example, the graphical user interface 300 may display the winnings of the client device 220*a* based on the wagers placed by the client device 220*a*, outcome of the network session, and the odds of that outcome occurring. In an example, the graphical user interface may also display winnings of other client devices 220 associated with the network session. For example, the network application may rank and display the winnings each of the client devices 220 as part of race wager scoreboard 336 and side wager scoreboard 338.

As an example, race wager outcome 340 can indicate an amount won by the client device 220*a* based on the wager of which representative tile will win the network session. The client device 220*a* wagered $75 that the spades tile would win the network session. Based on the spades tile winning the network session, the $75 wager, and the 3.3 odds, the network application may award the network profile associated with client device 220*a* with $247.13. This number may be determined based on multiplying the odds (e.g., in European format) with the wager amount. Similarly, the graphical user interface 300 may display the side wager outcome 342. For example, based on 17 cards being drawn during the network session, the $5 wager that 15-18 cards would be drawn, and the 2.89 odds, the network application may award the network profile associated with client device 220*a* with $14.47. In an example where the odds are updated (e.g., due to removal of tiles from the pool of tiles 306 during the game to dynamically change the odds), the payout may be determined based on the odds presented at the time the wager was placed. The graphical user interface 300 may not display the race wager outcome 340 if the client device 220*a* did not place a wager associated with a representative tile that won the network session. Similarly, the graphical user interface 300 may not display the side wager outcome 342 if the client device 220*a* did not place a wager associated with an outcome that occurred. In some examples, the payouts awarded to the client device 220*a* may be displayed as part of the winnings total 334. For example, the winnings total 334 can indicate an amount won by placing a wager on the winner of the race and/or placing a side wager. In some examples, the wager ledger 322 may be updated based on the outcome of the game. For example, wagered amounts (e.g., $130) may be subtracted from the balance displayed in the wager ledger 322 and won amounts (e.g., $247.13 and $14.47) may be added to the balance displayed in the wager ledger 322.

In some implementations, the winnings of client devices 220 associated with the network session may be displayed as part of the race wager scoreboard 336 and/or side wager scoreboard 338. The race wager scoreboard 336 can indicate a user identifier associated with a network profile of each client device 220 that participated in the network session and/or an amount won by those client devices 220. As an example, client device 220*a* may be represented by "User_1" and the other user identifiers (e.g., "User_2," "User_3," "User_4," and "User_5") may represent the other client devices 220 associated with the network session. In this example, the user identifiers may be ordered by which the payouts awarded to each of the client devices 220 based on their wagers. Similarly, the side wager scoreboard 338 may indicate the user identifiers associated with the client devices 220 that participated in the network session and/or an amount won by those client devices 220. In some examples, one or more client devices 220 may not be awarded a payout based on race wagers and/or side wagers during the network session. For example, client devices 220 that do not place a wager (e.g., race wagers or side wagers) associated with outcomes that occurred may not be awarded a payout.

In some implementations, network profiles of client devices 220 associated with a network session may be updated at the conclusion of the network session based on the wagers placed during the network session. The network profiles can be updated by adding or removing credits based on attributes of the network session. As an example, the network application may add $247.13 and $14.47 and subtract $130 from a network profile associated with the client device 220*a*. This may update the balance associated with the client device 220*a* to $5,132.30.

Figure 4:
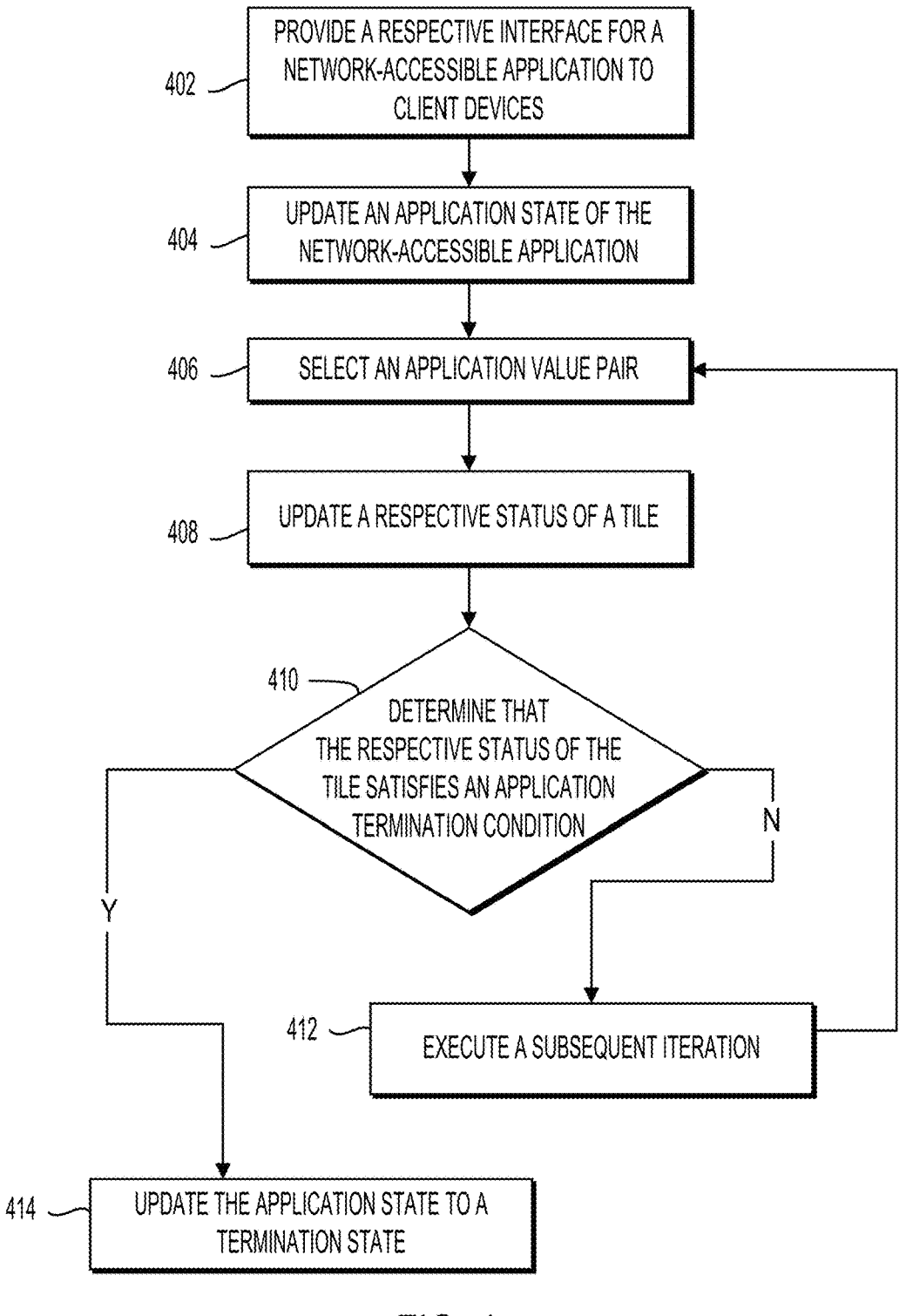
FIG. 4 illustrates an example flow diagram of a method for executing a network-accessible application with dynamic modification of application conditions, in accordance with one or more implementations.

Referring now to FIG. 4, depicted is an illustrative flow diagram of a method 400 for executing a network-accessible application with dynamic modification of application conditions. The method 400 can be executed, performed, or otherwise carried out by a data processing system. A data processing system (e.g., the data processing system 205) can be remote to one to one or more client devices and communicate with the one or more client devices via a computer network. In some implementations, the operations of method 400 can be performed by a standalone gaming device (e.g., without communicating with a gaming server to perform the method steps). In a brief overview of the method 400, the data processing system can provide a respective interface for a network accessible application to client devices (STEP 402), update an application state of the network-accessible application (STEP 404), select an application value pair (STEP 406), update a respective status of a tile (STEP 408), and determine whether the respective status of the tile satisfies an application termination condition (STEP 410). In response to determining that the respective status of the tile does not satisfy the application termination condition, the data processing system can execute a subsequent iteration of the network-accessible application by returning to STEP 406 (STEP 412). In response to determining that the respective status of the tile does satisfy the application termination condition, the data processing system can update the application state to a termination state (STEP 414).

In further detail of the method 400, the data processing system can provide a respective interface for a network-accessible application to client devices (STEP 402). For example, the data processing system can provide respective interface associated with a network session of the network-accessible application. In an example, the network session may be an execution of the network-accessible application that includes several iterations that determine a game outcome of the network session. The respective interfaces may include a plurality of tiles that each correspond to a respective identifier value (e.g., suit) of a group of identifier values within the network-accessible application (e.g., representative tiles 310 of FIG. 3A). In an example, the respective interface may include a set of sequential positions (e.g., track 308 of FIG. 3A). In this example, updating the status of a tile can include moving the position of the tile forward in the set of sequential positions. A tile from the plurality of tiles may be determined as a winner of the network session based on being a first tile to reach a final position (e.g., final position 308f) of the set of sequential positions. The data processing system may determine that the application termination condition has been satisfied based on a tile reaching the final position. The network session may be terminated in response to determining the tile reached the final position.

In some implementations, the respective interfaces displayed to the client devices may be synchronized. For example, the respective interfaces may display one or more graphical elements that are synchronized. As an example, when a tile moves location within the network session, all of the respective interfaces may be updated to display the tile at the new location. In an example, respective interfaces can include some graphical elements that are synchronized and some graphical elements that are unique to each client device. For example, tiles that represent classes (e.g., representative tiles 310 of FIG. 3A) may be synchronized while wager icons (e.g., wager icons 314 of FIG. 3A) may uniquely displayed on each client device.

In some implementations, the data processing system may receive wagers. For example, the data processing system may receive an interaction from a client device of the plurality of client devices that moves an interactive element to indicate a wager. The respective interface may display wager icons (e.g., wager icons 314 of FIG. 3A) as interactive elements that can be relocated on the interface based on interactions received from the client device. The wager icons may include different wager icons that each represent a different client value. A client value representing an amount of the wager may be determined based on which wager icon is selected (e.g., moved). In an example, the respective interface can include a set of regions that correspond to each class (e.g., suit) that a wager can be placed on. In this example, the data processing system can determine which tile a client device is transmitted a wager for based on which region the interactive element is moved to. For example, the data processing system can receive an interaction that indicates a movement of an interactive element (e.g., wager icon) to a region of the respective interface that corresponds to a first tile. Based on receiving an interaction that moves a wager icon to an area associated with the first tile, the data processing system can generate an association between the first tile and a respective client value associated with the wager icon. The client value can indicate a numerical amount of the wager. At the termination of a network session, a network profile can be updated based on the client value. For example, in response to determining that the first tile associated with the client value has won the network session, the data processing system may add credits (e.g., money, points, and/or the like) to the network profile. In this example, the number of credits added to the network profile may be based on the client value and/or odds of the first tile winning the network session.

In some implementations, the data processing system may receive side wagers that predict application conditions other than a winning tile of a network session. For example, the data processing system may receive a selection of an application condition and a second client value from the client device. The selection can indicate a variety of application conditions. For example, the selection can indicate a number of second value pairs (e.g., stopper values 318 of FIG. 3B) that are selected in the network session of the network-accessible application. As another example, the selection can indicate a threshold which the first selected application value pair is predicted to be over or under (e.g., such as the wager indicated by wager icons 314b of FIG. 3A). As yet another example, the selection can indicate a range of how many application value pairs will be selected during the network session. Once the application state has been updated to the termination state, the data processing system may assess whether the side wagers received from the client device were accurate and then update the network profile of the client device from which they were received accordingly. For example, in response to determining that a wager correctly predicted the number of second value pairs that are selected, credits may be added to the network profile of the client device. Conversely, in response to determining that a wager incorrectly predicted how many application value pairs were selected, credits (e.g., in an amount of the client value) may be subtracted from the network profile.

The data processing system may update an application state of the network-accessible application to an execution state (STEP 404). For example, the applications state may be updated in response to receiving client values from the client devices. This may initiate a network session of the network application. Receiving client values from each of the client devices can represent receiving a wager on which tile will win the network session. In some examples, the application state may be updated in response to receiving a threshold number of client values. Alternatively, the application state may be updated in response to receiving a client value from each client device assigned to the network-accessible application. In some examples, client devices may be assigned to the network-accessible application based on a request of the client device. Client devices may be assigned to the network-accessible application before the application state is updated to the execution state. The application state may be updated to the execution state in response to the network-accessible application (e.g., network session of the network-accessible application) being assigned a threshold number of client devices and/or receiving client values from those client devices. In an example, the network session may not accept additional client devices once it has been started. Alternatively, the network session may accept client devices after the network session has started. In an example, the data processing system may limit which attributes of the network-accessible application the client device can submit a client value for. For example, client devices that join after the application state has been updated to the execution state may be limited to placing certain side wagers.

In some implementations, the probability of different tiles winning may be dynamically changed at the start of a network session. For example, in response to updating the application state to the execution state, the data processing system may remove a subset of application value pairs from the pool of application value pairs. The subset may be randomly selected from the pool of application value pairs or may be the next subset of application value pairs that would have been chosen (e.g., removed from the top of the stack of application value pairs). Removing the subset may change a probability of which tile will satisfy the application termination condition first. For example, the number of application value pairs that match a respective identifier value of a tile may change based on the cards that are removed from the pool. In an example, the data processing system may generate an initial value for each tile (e.g., each class represented by the tiles) based on the pool of application value pairs with the subset removed. The initial values may represent new probabilities of each tile being the tile to satisfy the application termination condition. In some examples, the initial values may be displayed on the respective interface. The initial values may inform subsequent client values submitted by the client device. In an example, the initial values may also affect the credits added to the network profile of the client device if a client value is submitted for that identifier value, and the associated tile satisfies the application termination condition (e.g., the associated tile wins the network session). As an example, if the corresponding initial value indicates a low probability of a tile winning the network session, this can result in more credits (e.g., than if the probability was high) being added to the network profile of a client device that submits a client value for that tile if the tile does win the network session.

In some implementations, the respective interface may display the application value pairs that have been removed from the pool of application value pairs. For example, the subset of application value pairs may be provided for display at the respective interface. In some examples, the subset may be defined for a predefined period of time. In an example, client devices may be permitted to modify submitted client values based on the displayed subset of application value pairs. Additionally, or alternatively, client devices may be provided an opportunity to submit new client values associated with a tile based on the displayed subset of application value pairs. Wagers may therefore be submitted and/or modified based on the displayed subset of application value pairs.

The data processing system may select an application value pair (STEP 406). For example, the data processing system may select and display a first application value pair from the pool of application value pairs. The application value pair may be randomly selected or selected based on a predefined order associated with the pool of application value pairs. In an example, the application value pair may be selected from the pool of application value pairs less the subset of application value pairs that have been removed.

The data processing system may update a respective status of a tile based on the selected application value pair (STEP 408). For example, in response to determining that a first sub-value of the application value pair matches a respective identifier of a tile, the data processing system may update a respective status of the tile. The application value pairs can include one or more sub-values. For example, each application value pair can include a first sub-value representing a class (e.g., heart, spades, clubs, or diamonds) and a second sub-value representing an organizational value (e.g., 2-10, jack, queen, king). In an example, each tile may also be associated with a first sub-value representing a class. In this example, there may be a set number of classes (e.g., four suits), and each tile may correspond to one of the classes. An application value pair may be determined to match the tile when the first sub-value (e.g., suit) of the application value pair matches the class (e.g., suit) of the tile. Updating the respective status of a tile can include advancing the tile one position on the set of sequential positions (e.g., track 308 of FIG. 3A) displayed on the respective interface.

In some implementations, the data processing system may reveal second value pairs (e.g., stopper values) that can reverse a position of a tile based on whether the group of tiles satisfy a status criterion. The status criterion may define a threshold position in the set of sequential positions. In response to determining that all tiles have satisfied this threshold position, the data processing system may reveal a second value pair from a pool of second value pairs associated with the threshold. In an example, there may be a second value pair associated with some or all of the positions in the set of sequential positions. As a result, there may be multiple second value pairs. Each second value pair may be associated with a designated threshold position and can be displayed at that threshold on the respective interface. The second values may not display their value (e.g., may be displayed facedown) until they are selected. The data processing may select the second value pair associated with a threshold position in response to determining that all of the tiles have satisfied the threshold position. In some examples, a respective status of a tile may be updated in response to matching a first sub-value of the second value pair. For example, in response to a class (e.g., suit) of the second value pair matching a class of a tile, that tile may be moved back one position in the set of sequential positions.

In some implementations, the probability of whether each tile will be the tile to satisfy the termination condition may be dynamically changed during the network session of the network-accessible application. For example, in response to updating a respective status of a tile (e.g., moving a tile forward), the data processing system may determine whether the application state satisfied a removal condition. In an example, the application state can indicate attributes of the network session such as a number of second value pairs that have been revealed, positions of the tiles, a number of application value pairs that have been selected and/or the like. A removal condition may define a threshold application state based on which application value pairs can be removed from the pool of application value pairs to dynamically change a probability of each tile winning the network session. As an example, a removal condition may be two second value pairs being revealed. As another example, a removal condition may be five application value pairs being selected from the pool of application value pairs. As yet another example, a removal condition may be a time period starting from when the application state was updated to the execution state. In response to determining that the application state satisfies the removal condition, a predefined number of application value pairs may be removed from the pool of application value pairs. In some examples, the data processing system can update the initial values for each tile that indicate a probability of winning the network session based on removing application value pairs from the pool of application value pairs. In some examples, the data processing system can display the application value pairs that are removed from the pool of application value pairs on the respective interface to each of the client devices.

The data processing system may determine whether the respective status of the tile satisfies an application termination condition (STEP 410). The termination condition may be determined by whether any tile has reached the final position (e.g., finish line) of the set of sequential positions. Each time a tile is advanced by a position, the data processing system can determine if it has advanced to the final position. In response to determining whether the tile has advanced to the final position, the data processing system may either repeat the process and select another application value pair from the pool of application value pairs or update the application status to the termination state and update network profiles of client devices according to client values that have been submitted throughout the network session.

In response to determining that the tile does not satisfy the application termination condition, the data processing system may execute a subsequent iteration (STEP 412). For example, in response to determining that the tile that was advanced one position did not advance to the finish line, the data processing system may repeat the process of selecting an application value pair starting at STEP 406. Iterations of the network session may be repeated continuously until one of the tiles does satisfy the termination condition.

In response to determining that the tile satisfies the application termination condition, the data processing system may update the application state to a termination state (STEP 414). For example, in response to determining that the tile which was advanced one position was advanced to the final position in the set of sequential positions, the data processing system may determine that the tile has won the network session and may therefore update the application state to the termination state. Updating the application state to the network state may terminate the network session. In some examples, subsequent network sessions of the network-accessible application may be executed after the network session has been terminated.

In some implementations, the data processing system may update network profiles of each client device in response to updating the applications state to the termination state. For example, the data processing system may update the network profiles based on the received client values and the tile that satisfied the termination condition. In this example, the data processing system may add credits to network profiles that transmitted a client value associated with the tile that satisfied the termination condition. Similarly, the data processing system may remove credits from network profiles that transmitted a client value that was associated with a tile other than the tile that satisfied the termination condition. As a result, the data processing system may update network profiles based on whether wagers placed by the client devices was accurate and an amount (e.g., client value) associated with the wager. In some examples, the network profiles may also be updated based on side wagers placed by the client devices. Similarly, the data processing system may update network profiles based on whether side wagers were accurate and an amount (e.g., second client value) associated with the side wager. For example, once the application state is updated to the termination state, the data processing system may determine attributes of the network session, such as how many application value pairs were selected or how many second value pairs were revealed. Based on determining that a side wager that predicted an attribute of the network session was accurate, the data processing system may add credits to an associated network profile.

Alternatively, based on determining that a side wager did not accurately predict the attribute of the network session, the data processing system may remove credits from an associated network profile.

Figure 5:
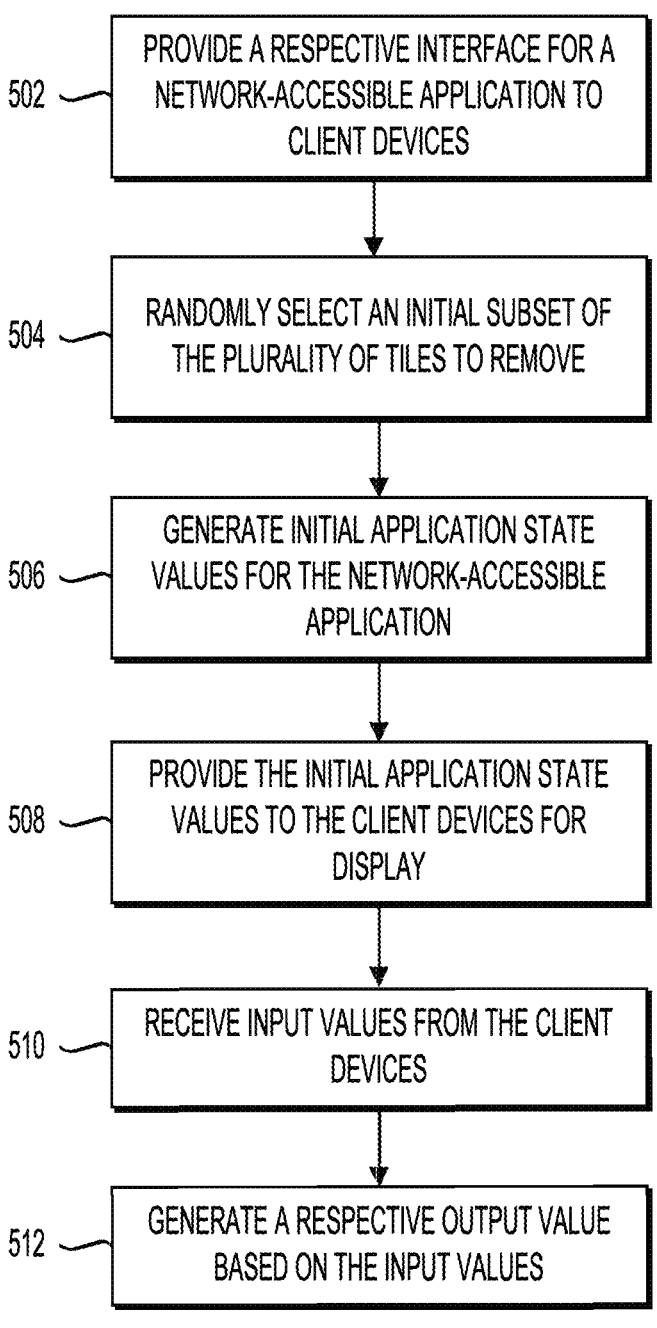
FIG. 5 illustrates an example flow diagram of a method for dynamic modification of application conditions within iterative network-accessible applications, in accordance with one or more implementations.

Referring now to FIG. 5, depicted is an illustrative flow diagram of a method 500 for dynamic modification of application conditions within iterative network-accessible applications. The method 500 can be executed, performed, or otherwise carried out by a data processing system. A data processing system (e.g., the data processing system 205) can be remote to one or more client devices and may communicate with the one or more client devices via a computer network. In some implementations, the operations of method 500 can be performed by a standalone gaming device (e.g., without communicating with a gaming server to perform the method steps). In a brief overview of the method 500, the data processing system can provide a respective interface for a network-accessible application to client devices (STEP 502), randomly select an initial subset of the plurality of tiles to remove (STEP 504), generate initial application state values for the network-accessible application (STEP 506), provide initial application state values to the client devise for display (STEP 508), receive input values from the client devices (STEP 510), and generate a respective output value based on the input values (STEP 512).

In further detail of the method 500, the data processing system may provide a respective interface for a network-accessible application to client devices (STEP 502). For example, a group of client devices may be assigned to the network-accessible application. In this example, the group of client devices may be assigned to a network session representing an individual execution of the network-accessible application. The data processing system may assign the group of the client devices to the network session in response to receiving a request from each client device to execute the network-accessible application. The group of client devices may each be provided with the respective interface. The respective interface can include graphical elements. For example, the respective interface can include tiles as graphical elements. The tiles may be displayed as icons that represent classes (e.g., spades tile 310*a*, hearts tile 310*b*, clubs tile 310*c*, and diamonds tile 310*d* of FIG. 3A) and icons that can be revealed as the network-accessible application is executed (e.g., pool of tiles 306 of FIG. 3A). The respective interface may also include other graphical elements, such as wager icons (e.g., wager icons 314 of FIG. 3A). In some examples, the graphical elements may be synchronized. For example, the tiles may display the same position and movement on each respective interface. Additionally, or alternatively, some graphical elements may not be synchronized between client devices. For example, a client device can transmit input that moves a wager icon. In this example, the new placement of the wager icon may be displayed on the client device that transmitted the input.

The data processing system may randomly select an initial subset of the tiles to remove (STEP 504). For example, the data processing system may dynamically modify a probability of an output associated a set of classes represented by the tiles based on randomly removing the initial subset of tiles. Tiles may be associated with identifier values including a first sub-value representing a class (e.g., suit) and a second sub-value representing an organizational value (e.g., 2-7, jack, queen, king, and ace) of the tile. In an example, a tile of each class may be present for each organization tile in the plurality of tiles. In this example, a set of organizational values in each class may be selected to represent the classes. In an example where the tiles represent cards within a deck of cards, a set of ace tiles may be selected as representative tiles to represent the spades, heart, clubs, and diamonds classes. These tiles may be removed from the plurality of tiles and displayed faceup on the respective interface, so that their class and organizational value are apparent. In this example, the remaining tiles may be displayed facedown (or represented jointly by an icon) such that their first and second sub-value are not apparent. In some examples, the data processing system may remove an initial subset from the remaining tiles. For example, the data processing system may remove a predefined number of tiles as the initial subset from the remaining tiles to dynamically change the number of tiles in the remaining tiles that match the class of each representative tile. The remaining tiles less the initial subset may form a pool of tiles from which tiles can be selected during execution of the application.

The data processing system may generate initial application state values for the network-accessible application (STEP 506). For example, the data processing system may determine a probability of each class winning the network session of the network-accessible application based on the plurality of tiles less the initial subset. In an example, the respective interface can display a set of sequential positions. Representative tiles may be advanced on the set of sequential positions based on tiles that display a matching class being selected from the pool of tiles. A representative tile may be determined to win the network session based on reaching a final position (e.g., final position 308f of FIG. 3A) of the set of sequential positions. Tiles that represent a class with more matching tiles in the pool of tiles may have a greater probability of winning, since the probability of selecting a tile from the pool of tiles that indicates a matching class is greater. The initial application state values may include a probability of the associated representative tile winning the network session for each class.

The data processing system may provide initial application state values to the client device for display (STEP 508). For example, the data processing system may display the initial applications state values indicating a probability of each tile winning the network session on each respective interface provided to the client devices. In some implementations, the respective interface may also display the initial subset. For example the respective interface may display the class and organizational value of each tile in the initial subset. The initial application state values and/or initial, subset may inform user input provided from the client devices.

The data processing system may receive input values from the client devices (STEP 510). For example, client devices may transmit input values that are associated with one of the classes. The input values may indicate a confidence that the associated representative tile will win the network session. In some examples, an input value of a client device may be associated with a network profile of the client device. For example, the data processing system may include a group of network profiles. Client devices may submit input values based in part on an attribute of their associated network profiles. For example, network profiles can be associated with a number of credits. In this example, client devices may submit input values up to the number of credits in their associated network profiles. The input values can be associated with one of the representative tiles. For example, the input values can represent a wager that the associated representative tile will win the network session. Based on the results of the network session, credits may be added or subtracted from network profiles of client devices based on submitted input values.

In some implementations, client devices may indicate input values using interactive elements. For example, the respective interface can include wager icons as interactive elements. In this example, client devices can transmit input that moves the position of wager icons within the respective interface. For example, the data processing system may receive an interaction from a client device that indicates a movement of a wager icon. This interaction can move the wager icon to a region of the respective interface corresponding to a first tile. The first tile can be one of the representative tiles that represent a class. Based on the new location of the wager icon, the data processing system can generate an association between the first tile and the client value. For example, the data processing system can determine which class a client device is transmitting a wager on based on the region that the wager icon has been moved to. In some examples, the interactive elements can represent different values. For example, wager icons may each represent different credit amounts. The data processing system may determine an amount of the client value based on which wager icon is moved to the region of the respective interface. Therefore, the data processing system may determine a wager amount based on which wager icon is moved and a class that the wager is placed on based on which region of the respective interface the wager icon is moved to.

In some implementations, the data processing system may execute the network-accessible application. For example, the data processing system may execute iterations of the network session of the network-accessible application. by selecting tiles from the pool of tiles. In some implementations, the data processing system may select a first tile associated with a first identifier value from the pool of tiles. The first identifier value can include a first-sub-value indicating a class of the tile. Based on the class of the tile, the data processing system may update a first status of the first identifier value. For example, in response to determining that the class of the first tile matches a class of a representative tile, the data processing system may update a first status of the first identifier value by advancing the representative tile by one position within the set of sequential positions.

In some implementations, the data processing system can evaluate whether the network-accessible application satisfies a termination condition after updating the status of a representative tile. The application termination condition can be that a representative tile has reached the final position. In response to advancing a representative tile by one position, the data processing system may determine whether the representative tile has reached the final position. If the first tile has not reached the final position, the data processing system may determine that the first status of the first tile does not satisfy the application termination condition. Based on this determination, the data processing system may select a second tile from the associated with a second identifier value from the pool of tiles. The data processing system may repeat the process performed with the first tile to update a status of the second identifier value. The data processing system can then determine if the second tile satisfies the termination condition. These iterations can be repeated until one of the representative tiles reaches the final position (e.g., satisfies the termination condition). When the data processing system determines that the first status (e.g. position) of the first tile does satisfy the application termination condition, the data processing system may generate respective output values for each client device. The respective output values can be generated based on the input values and their associated identifier values (e.g., classes).

In some implementations, the data processing system may select second values (e.g., stopper values) based on application conditions. For example, in response to determining that the first identifier value satisfies a first criterion, the data processing system may select a second value from a pool of second values. As an example, the first criterion may be that the representative tiles associated with a set of identifier values (e.g., classes) have satisfied a threshold position on the interface. Each time a representative tile advances, the data processing system may determine whether it is the last to advance to a position. If a representative tile is the last to advance to a position, it may satisfy the first criterion. A second value may then be selected. Based on the selected second value, a representative tile associated with a matching value may be moved back by one position. For example, the second value may indicate a class. The data processing system may determine a third identifier value that matches the class of the second value. A third status of the third identifier value may then be updated, which can move an identifier value corresponding to the third identifier value back by one position. In some examples, there may be multiple second values that are each associated with a unique position in the set of sequential positions. In these examples, when the position associated with a second value is satisfied by all representative tiles, that second value may be selected. The matching representative tile may then be moved back one position.

In some implementations, client devices may submit input values associated with a prediction of the number of second values that will be selected in a network session. For example, the data processing system may receive an input value indicating a number of selected second values. Within the network-accessible application, different numbers of second values may be revealed based on which position all representative tiles satisfy. The network profile of a client device may be updated based on whether the prediction associated with the input value was accurate.

In some implementations, the data processing system may dynamically modify a probability of an output during a network session. For example, during execution of the network-accessible application, it may be determined that an application state of the network-accessible application satisfies a removal condition. The application state can represent various attributes of the network-accessible application, such as positions of the representative tiles, input values received, a number of tiles selected, and/or the like. In an example, an attribute may be designated as a removal condition. As an example, a threshold value indicating a total value of the input values received from client devices may be designated as the removal condition. In this example, client devices may transmit input values at the start of a network session as well as during the network session. In response to determining that the threshold of input values has been satisfied, the data processing system may remove more tiles from the pool of tiles. The data processing system can thereby generate a second plurality of tiles representing the plurality of tiles with both the initial and second subset of tiles removed. In some examples, the data processing system can update application state values based on the second plurality of tiles. The data processing system may also display the updated application state values and/or the second subset of tiles on the respective interface.

The data processing system may generate a respective output value based on the input values (STEP 512). For example, the application state can be updated to a termination state based on determining that a representative tile reached the final position. This can terminate the associated network session of the network-accessible application. The data processing system can then generate an output value for each client device based on the input values that the client device submitted and the application state after it has been updated to the termination state. For example, in addition to indicating whether the network-accessible application is in the termination state, the application state can indicate other attributes of the network-accessible application, such as a winner of the network session that has terminated, how many tiles were selected, how many second values were selected, and/or the like. In some examples, the client devices may have transmitted first values indicating a prediction value and a prediction of the application state. The first values can be associated with credits held by the network profiles corresponding to the client devices. Based on determining that the predictions are true, the data processing system may update network profiles to add credits. Alternatively, based on determining that the predictions are not true, the data processing system may update network profiles to remove credits. In an example, the number of credits added or removed from a network profile of a client device may depend on an amount of input values and an application state value (e.g., odds) associated with the input values.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus," "data processing system," "client device," "computing platform," "computing device," or "device" encompass all kinds of apparatuses, devices, and machines for processing data, including by way of example a programmable processor, a computer, a system on a chip, or multiple ones, or combinations, of the foregoing. The apparatus can include special purpose logic circuitry (e.g., an FPGA, an ASIC, etc.). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as the data processing system 205 can include clients and servers. For example, the data processing system 205 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving input from a user interacting with the client device). Data generated at the client device (e.g., a result of an interaction, computation, or any other event or computation) can be received from the client device at the server, and vice versa.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the various computing systems described herein can include a single module, a logic device having one or more processing modules, or one or more servers.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided may be useful for assigning protected network sessions for network applications, the systems and methods described herein may be applied to other environments. The foregoing implementations are illustrative rather than limiting of the described systems and methods. The scope of the systems and methods described herein may thus be indicated by the appended claims, rather than the foregoing description, and changes that come within the meaning and range of equivalency of the claims are embraced therein.

What is claimed is:

1. A system, comprising:

one or more processors coupled to non-transitory memory, the one or more processors configured to:

provide, to a plurality of client devices, a respective interface for a network-accessible application, the respective interface comprising a graphical element representing a plurality of tiles for the network-accessible application;

upon an update to a state of the network-accessible application and prior to receiving a plurality of input values from the plurality of client devices, randomly select an initial subset of the plurality of tiles for display at the plurality of client devices;

generate one or more initial application state values for the network-accessible application based on the plurality of tiles less the initial subset;

provide the one or more initial application state values for the network-accessible application to the plurality of client devices for display at the respective interface of the network-accessible application;

receive, from the plurality of client devices, the plurality of input values to advance the state of the network-accessible application;

execute the network-accessible application according to the plurality of input values provided from the plurality of client devices and the one or more initial application state values, wherein executing the network-accessible application comprises:

selecting a first tile associated with a first identifier value from the plurality of tiles less the initial subset, wherein the plurality of tiles corresponds to a set of identifier values, and updating a first status of the first identifier value, determining that the network-accessible application satisfies an application termination condition based on the first status of the first identifier value, and upon determining that the network-accessible application satisfies the application termination condition, generating a respective output value for the network-accessible application based on the plurality of input values and the first status; and update a respective network profile of at least one client device of the plurality of client devices based on the respective output value of the at least one client device.

2. The system of claim 1, wherein the one or more processors are further configured to:

determine that the network-accessible application does not satisfy an application termination condition based on the first status of the first identifier value;

select a second tile associated with a second identifier value from the plurality of tiles less the initial subset; and update a second status of the second identifier value.

3. The system of claim 1, wherein the one or more processors are further configured to:

determine that the first identifier value of the set of identifier values satisfies a first criterion;

select a second value from a pool of second values responsive to determining that the first identifier value satisfies the first criterion; and update a third status of a third identifier value from the set of identifier values responsive to the third identifier value matching the second value.

4. The system of claim 3, wherein the one or more processors are further configured to:

receive an input value from a client device indicating a number of selected second values from the pool of second values; and update a network profile of the client device based on the input value matching a number of second values selected from the pool of variation values during execution of the network-accessible application.

5. The system of claim 1, wherein the one or more processors are further configured to:

generate an initial application state value for each tile of the plurality of tiles based on the plurality of tiles less the initial subset; and provide the initial subset for display via the respective interface provided to each of the plurality of client devices.

6. The system of claim 1, wherein the one or more processors are further configured to:

determine that an application state of the network-accessible application satisfies a removal condition; and generate a second plurality of tiles based on removing a second subset of tiles from the plurality of tiles less the initial subset responsive to determining that the application state satisfies the removal condition.

7. The system of claim 1, wherein the one or more processors are further configured to:

receive an interaction from a client device of the plurality of client devices indicating movement of an interactive element to a region of the respective interface corresponding to the first identifier value; and generate an association between the first tile and a respective client value received from the client device based on the interaction.

8. The system of claim 7, wherein the one or more processors are further configured to:

determine the respective client value based on the interactive element associated with the interaction received from the client device.

9. A method comprising:

providing, by at least one processor, to a plurality of client devices, a respective interface for a network-accessible application, the respective interface comprising a graphical element representing a plurality of tiles for the network-accessible application;

upon an update to a state of the network-accessible application and prior to receiving a plurality of input values from the plurality of client devices, randomly selecting, by at least one processor, an initial subset of the plurality of tiles for display at the plurality of client devices;

generating, by the at least one processor, one or more initial application state values for the network-accessible application based on the plurality of tiles less the initial subset;

providing, by the at least one processor, the one or more initial application state values for the network-accessible application to the plurality of client devices for display at the respective interface of the network-accessible application;

receiving, by the at least one processor, from the plurality of client devices, the plurality of input values to advance the state of the network-accessible application;

executing, by the at least one processor, the network-accessible application according to the plurality of input values provided from the plurality of client devices and the one or more initial application state values, wherein executing the network-accessible application comprises:

selecting, by the at least one processor, a first tile associated with a first identifier value from the plurality of tiles less the initial subset, wherein the plurality of tiles corresponds to a set of identifier values, and updating, by the at least one processor, a first status of the first identifier value, determining, by the at least one processor, that the network-accessible application satisfies an application termination condition based on the first status of the first identifier value, and upon determining that the network-accessible application satisfies the application termination condition generating, by the at least one processor, a respective output value for the network-accessible application based on the plurality of input values; and updating, by the at least one processor, a respective network profile of at least one client device of the plurality of client devices based on the respective output value of the at least one client device.

10. The method of claim 9, further comprising:

determining, by the at least one processor, that the network-accessible application does not satisfy an application termination condition based on the first status of the first identifier value;

selecting, by the at least one processor, a second tile associated with a second identifier value from the plurality of tiles less the initial subset; and updating, by the at least one processor, a second status of the second identifier value.

11. The method of claim 9, further comprising:

determining, by the at least one processor, that the first identifier value of the set of identifier values satisfies a first criterion;

selecting, by the at least one processor, a second value from a pool of second values responsive to determining that the first identifier value satisfies the first criterion; and updating, by the at least one processor, a third status of a third identifier value from the set of identifier values responsive to the third identifier value matching the second value.

12. The method of claim 11, further comprising:

receiving, by the at least one processor, an input value from a client device indicating a number of selected second values from the pool of second values; and updating, by the at least one processor, a network profile of the client device based on the input value matching a number of second values selected from the pool of variation values during execution of the network-accessible application.

13. The method of claim 9, further comprising:

generating, by the at least one processor, an initial application state value for each tile of the plurality of tiles based on the plurality of tiles less the initial subset; and providing, by the at least one processor, the initial subset for display via the respective interface provided to each of the plurality of client devices.

14. The method of claim 9, further comprising:

determining, by the at least one processor, that an application state of the network-accessible application satisfies a removal condition; and generating, by the at least one processor, a second plurality of tiles based on removing a second subset of tiles from the plurality of tiles less the initial subset responsive to determining that the application state satisfies the removal condition.

15. The method of claim 9, further comprising:

receiving, by the at least one processor, an interaction from a client device of the plurality of client devices indicating movement of an interactive element to a region of the respective interface corresponding to the first identifier value; and generating, by the at least one processor, an association between the first identifier value and a respective client value received from the client device based on the interaction.

16. The method of claim 15, further comprising:

determining, by the at least one processor, the respective client value based on the interactive element associated with the interaction received from the client device.

\* \* \* \* \*